(12) United States Patent
Luo et al.

(10) Patent No.: US 9,106,378 B2
(45) Date of Patent: Aug. 11, 2015

(54) SYSTEMS, APPARATUS AND METHODS FOR COMMUNICATING DOWNLINK INFORMATION

(75) Inventors: Tao Luo, San Diego, CA (US); Yongbin Wei, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 12/792,411

(22) Filed: Jun. 2, 2010

(65) Prior Publication Data

US 2011/0053603 A1    Mar. 3, 2011

Related U.S. Application Data

(60) Provisional application No. 61/185,727, filed on Jun. 10, 2009.

(51) Int. Cl.
| | | |
|---|---|---|
| H04W 72/00 | (2009.01) | |
| H04L 5/00 | (2006.01) | |
| H04W 28/04 | (2009.01) | |

(52) U.S. Cl.
CPC ............ *H04L 5/0053* (2013.01); *H04L 5/0007* (2013.01); *H04L 5/0091* (2013.01); *H04W 28/04* (2013.01)

(58) Field of Classification Search
CPC ..... H04W 28/02; H04W 12/02; H04W 12/06; H04W 12/10; H04L 5/0053; H04L 5/0091
USPC ......... 370/329, 328, 335, 350, 342, 330, 347, 370/338; 455/502, 450, 525
See application file for complete search history.

(56) References Cited

U.S. PATENT DOCUMENTS

| 4,857,863 A | 8/1989 | Ganger et al. |
|---|---|---|
| 5,051,625 A | 9/1991 | Ikeda et al. |

(Continued)

FOREIGN PATENT DOCUMENTS

| CN | 1311968 A | 9/2001 |
|---|---|---|
| CN | 101018220 A | 8/2007 |

(Continued)

OTHER PUBLICATIONS

3GPP: "3rd Generation Partnership Project; Technical Specification Group Radio Access Network; Evolved Universal Terrestrial Radio Access (E-UTRA); Physical layer procedures (Release 8)" 3GPP TS 36.213 V8.7.0 (May 2009) Technical Specification, No. V8.7.0, Jun. 8, 2009, pp. 1-77, XP002602609.

(Continued)

*Primary Examiner* — Khalid Shaheed
(74) *Attorney, Agent, or Firm* — Nerrie M. Zohn

(57) ABSTRACT

Systems and methods facilitating communication of downlink information are provided. In one embodiment, a method can include receiving a signal indicative of a base station enabling or disabling a function, wherein the function is configured to transmit information carried in control channels using selected downlink information; receiving the selected downlink information at one or more locations; and determining a resource allocation of at least one of paging information or system information or unicast data information based, at least, on the selected downlink information. The determining can be performed without decoding control channels corresponding to the selected downlink information in response to receiving a signal indicative of the function being enabled.

49 Claims, 12 Drawing Sheets

(56) References Cited

U.S. PATENT DOCUMENTS

| | | | |
|---|---|---|---|
| 5,587,678 A | 12/1996 | Dijkmans | |
| 5,745,012 A | 4/1998 | Oka et al. | |
| 5,748,019 A | 5/1998 | Wong et al. | |
| 5,786,734 A | 7/1998 | Park | |
| 5,949,259 A | 9/1999 | Garcia | |
| 5,973,512 A | 10/1999 | Baker | |
| 5,982,246 A | 11/1999 | Hofhine et al. | |
| 6,040,744 A | 3/2000 | Sakurai et al. | |
| 6,147,550 A | 11/2000 | Holloway | |
| 6,151,492 A * | 11/2000 | Melin | 455/435.3 |
| 6,167,240 A | 12/2000 | Carlsson et al. | |
| 6,222,851 B1 | 4/2001 | Petry | |
| 6,359,869 B1 | 3/2002 | Sonetaka | |
| 6,504,830 B1 * | 1/2003 | Ostberg et al. | 370/342 |
| 6,556,094 B2 | 4/2003 | Hasegawa et al. | |
| 6,653,878 B2 | 11/2003 | Nolan | |
| 6,677,799 B1 | 1/2004 | Brewer | |
| 6,724,813 B1 * | 4/2004 | Jamal et al. | 375/219 |
| 6,734,747 B1 | 5/2004 | Ishikawa et al. | |
| 6,819,168 B1 | 11/2004 | Brewer | |
| 6,819,195 B1 | 11/2004 | Blanchard et al. | |
| 7,019,551 B1 | 3/2006 | Biesterfeldt | |
| 7,129,798 B2 | 10/2006 | Aoyama et al. | |
| 7,142,059 B2 | 11/2006 | Klein et al. | |
| 7,420,395 B2 | 9/2008 | Kuramasu | |
| 7,630,339 B2 | 12/2009 | Laroia et al. | |
| 7,652,533 B2 | 1/2010 | Wang et al. | |
| 7,710,212 B2 | 5/2010 | Seliverstov | |
| 7,742,444 B2 | 6/2010 | Mese et al. | |
| 7,786,779 B2 | 8/2010 | Chang et al. | |
| 7,795,902 B1 | 9/2010 | Yella | |
| 7,817,666 B2 | 10/2010 | Spinar et al. | |
| 7,843,886 B2 | 11/2010 | Johnson et al. | |
| 7,859,314 B2 | 12/2010 | Rutkowski et al. | |
| 7,924,066 B2 | 4/2011 | Gagne et al. | |
| 7,940,740 B2 | 5/2011 | Krishnamurthy et al. | |
| 8,010,151 B2 | 8/2011 | Kim et al. | |
| 8,058,928 B2 | 11/2011 | Terzioglu | |
| 8,077,670 B2 | 12/2011 | Fan et al. | |
| 8,085,875 B2 | 12/2011 | Gore et al. | |
| 8,155,069 B2 | 4/2012 | Chun et al. | |
| 8,174,995 B2 | 5/2012 | Malladi | |
| 8,228,827 B2 | 7/2012 | Jeong et al. | |
| 8,363,697 B2 | 1/2013 | Grob et al. | |
| 8,446,869 B2 | 5/2013 | Lee et al. | |
| 2005/0064873 A1 * | 3/2005 | Karaoguz et al. | 455/452.2 |
| 2005/0096061 A1 | 5/2005 | Ji et al. | |
| 2005/0254555 A1 | 11/2005 | Teague et al. | |
| 2005/0260990 A1 | 11/2005 | Huang et al. | |
| 2006/0098604 A1 | 5/2006 | Flammer et al. | |
| 2006/0166693 A1 | 7/2006 | Jeong et al. | |
| 2007/0064669 A1 | 3/2007 | Classon et al. | |
| 2007/0087691 A1 | 4/2007 | Lee et al. | |
| 2007/0104166 A1 | 5/2007 | Rahman et al. | |
| 2007/0153719 A1 | 7/2007 | Gopal | |
| 2007/0167181 A1 | 7/2007 | Ramesh et al. | |
| 2007/0242763 A1 | 10/2007 | Li et al. | |
| 2007/0253355 A1 | 11/2007 | Hande et al. | |
| 2008/0008212 A1 | 1/2008 | Wang et al. | |
| 2008/0013500 A1 | 1/2008 | Laroia et al. | |
| 2008/0056193 A1 | 3/2008 | Bourlas et al. | |
| 2008/0075032 A1 | 3/2008 | Balachandran et al. | |
| 2008/0106297 A1 | 5/2008 | Jao | |
| 2008/0130588 A1 | 6/2008 | Jeong et al. | |
| 2008/0205322 A1 | 8/2008 | Cai et al. | |
| 2008/0212514 A1 | 9/2008 | Chen | |
| 2008/0219236 A1 | 9/2008 | Love et al. | |
| 2008/0220791 A1 | 9/2008 | Cho et al. | |
| 2008/0227449 A1 | 9/2008 | Gholmieh et al. | |
| 2008/0253300 A1 | 10/2008 | Wakabayashi et al. | |
| 2008/0254804 A1 | 10/2008 | Lohr et al. | |
| 2008/0260000 A1 | 10/2008 | Periyalwar et al. | |
| 2008/0268859 A1 | 10/2008 | Lee et al. | |
| 2008/0285513 A1 | 11/2008 | Jung et al. | |
| 2009/0069023 A1 | 3/2009 | Ahn et al. | |
| 2009/0088175 A1 | 4/2009 | Pelletier et al. | |
| 2009/0109915 A1 | 4/2009 | Pasad et al. | |
| 2009/0135769 A1 | 5/2009 | Sambhwani et al. | |
| 2009/0154458 A1 | 6/2009 | Kim et al. | |
| 2009/0175214 A1 | 7/2009 | Sfar et al. | |
| 2009/0196165 A1 * | 8/2009 | Morimoto et al. | 370/208 |
| 2009/0196249 A1 | 8/2009 | Kawamura et al. | |
| 2009/0196250 A1 | 8/2009 | Feng et al. | |
| 2009/0197631 A1 | 8/2009 | Palanki et al. | |
| 2009/0201880 A1 * | 8/2009 | Aghili et al. | 370/331 |
| 2009/0213769 A1 | 8/2009 | Shen et al. | |
| 2009/0238117 A1 | 9/2009 | Somasundaram et al. | |
| 2009/0239590 A1 * | 9/2009 | Parkvall | 455/572 |
| 2009/0252077 A1 | 10/2009 | Khandekar et al. | |
| 2009/0257371 A1 | 10/2009 | Nishio | |
| 2009/0257393 A1 | 10/2009 | Ji et al. | |
| 2009/0264077 A1 | 10/2009 | Damnjanovic | |
| 2009/0268684 A1 | 10/2009 | Lott et al. | |
| 2009/0274086 A1 | 11/2009 | Petrovic et al. | |
| 2009/0298498 A1 | 12/2009 | Pisut et al. | |
| 2009/0312024 A1 | 12/2009 | Chen et al. | |
| 2009/0325626 A1 | 12/2009 | Palanki et al. | |
| 2010/0008282 A1 | 1/2010 | Bhattad et al. | |
| 2010/0022250 A1 | 1/2010 | Petrovic et al. | |
| 2010/0029282 A1 | 2/2010 | Stamoulis et al. | |
| 2010/0034135 A1 | 2/2010 | Kim et al. | |
| 2010/0034158 A1 | 2/2010 | Meylan | |
| 2010/0035600 A1 | 2/2010 | Hou et al. | |
| 2010/0067472 A1 | 3/2010 | Ball et al. | |
| 2010/0069076 A1 | 3/2010 | Ishii et al. | |
| 2010/0080154 A1 | 4/2010 | Noh et al. | |
| 2010/0091919 A1 | 4/2010 | Xu et al. | |
| 2010/0110964 A1 | 5/2010 | Love et al. | |
| 2010/0144317 A1 * | 6/2010 | Jung et al. | 455/411 |
| 2010/0232373 A1 | 9/2010 | Nory et al. | |
| 2010/0240386 A1 | 9/2010 | Hamabe et al. | |
| 2010/0246521 A1 | 9/2010 | Zhang et al. | |
| 2010/0254268 A1 | 10/2010 | Kim et al. | |
| 2010/0254329 A1 | 10/2010 | Pan et al. | |
| 2010/0254344 A1 | 10/2010 | Wei et al. | |
| 2010/0260156 A1 | 10/2010 | Lee et al. | |
| 2010/0265870 A1 | 10/2010 | Cai et al. | |
| 2010/0272059 A1 | 10/2010 | Bienas et al. | |
| 2010/0290372 A1 | 11/2010 | Zhong et al. | |
| 2010/0304665 A1 | 12/2010 | Higuchi | |
| 2010/0309803 A1 | 12/2010 | Toh et al. | |
| 2010/0309867 A1 | 12/2010 | Palanki et al. | |
| 2010/0309876 A1 | 12/2010 | Khandekar et al. | |
| 2010/0322180 A1 | 12/2010 | Kim et al. | |
| 2010/0323611 A1 | 12/2010 | Choudhury | |
| 2010/0331030 A1 | 12/2010 | Nory et al. | |
| 2011/0007673 A1 | 1/2011 | Ahn et al. | |
| 2011/0013554 A1 | 1/2011 | Koskinen | |
| 2011/0032890 A1 | 2/2011 | Wu | |
| 2011/0038271 A1 | 2/2011 | Shin et al. | |
| 2011/0044227 A1 | 2/2011 | Harrang et al. | |
| 2011/0044261 A1 | 2/2011 | Cai et al. | |
| 2011/0064037 A1 | 3/2011 | Wei et al. | |
| 2011/0116364 A1 | 5/2011 | Zhang et al. | |
| 2011/0134875 A1 | 6/2011 | Ding et al. | |
| 2011/0149771 A1 | 6/2011 | Abeta et al. | |
| 2011/0170503 A1 | 7/2011 | Chun et al. | |
| 2011/0182245 A1 | 7/2011 | Malkamaki et al. | |
| 2011/0188481 A1 | 8/2011 | Damnjanovic et al. | |
| 2011/0190024 A1 | 8/2011 | Seong et al. | |
| 2011/0194514 A1 | 8/2011 | Lee et al. | |
| 2011/0201279 A1 | 8/2011 | Suzuki et al. | |
| 2011/0205982 A1 | 8/2011 | Yoo et al. | |
| 2011/0211503 A1 | 9/2011 | Che et al. | |
| 2011/0243075 A1 | 10/2011 | Luo et al. | |
| 2011/0249643 A1 | 10/2011 | Barbieri et al. | |
| 2011/0268032 A1 | 11/2011 | Kim et al. | |
| 2011/0274066 A1 | 11/2011 | Tee et al. | |
| 2011/0275394 A1 | 11/2011 | Song et al. | |
| 2011/0310789 A1 | 12/2011 | Hu et al. | |
| 2011/0310830 A1 | 12/2011 | Wu et al. | |
| 2011/0317624 A1 | 12/2011 | Luo et al. | |
| 2012/0026892 A1 | 2/2012 | Nakao et al. | |
| 2012/0033588 A1 | 2/2012 | Chung et al. | |

(56) References Cited

U.S. PATENT DOCUMENTS

| | | |
|---|---|---|
| 2012/0033627 A1 | 2/2012 | Li et al. |
| 2012/0033647 A1 | 2/2012 | Moon et al. |
| 2012/0039180 A1 | 2/2012 | Kim et al. |
| 2012/0087250 A1 | 4/2012 | Song et al. |
| 2012/0088516 A1 | 4/2012 | Ji et al. |
| 2012/0093095 A1 | 4/2012 | Barbieri et al. |
| 2012/0093097 A1 | 4/2012 | Che et al. |
| 2012/0106481 A1 | 5/2012 | Cho et al. |
| 2012/0108239 A1 | 5/2012 | Damnjanovic et al. |
| 2012/0182958 A1 | 7/2012 | Pelletier et al. |
| 2012/0212260 A1 | 8/2012 | Chen et al. |
| 2012/0236798 A1 | 9/2012 | Raaf et al. |
| 2012/0281656 A1 | 11/2012 | Hooli et al. |
| 2013/0005344 A1 | 1/2013 | Dimou et al. |
| 2013/0077543 A1 | 3/2013 | Kim et al. |
| 2013/0077576 A1 | 3/2013 | Abe et al. |
| 2013/0229933 A1 | 9/2013 | Ji et al. |
| 2013/0250927 A1 | 9/2013 | Song |
| 2014/0036838 A1 | 2/2014 | Yoo et al. |
| 2014/0146798 A1 | 5/2014 | Damnjanovic et al. |

FOREIGN PATENT DOCUMENTS

| | | |
|---|---|---|
| CN | 101090281 A | 12/2007 |
| CN | 101155399 A | 4/2008 |
| CN | 101262680 A | 9/2008 |
| CN | 101316267 A | 12/2008 |
| CN | 101483511 A | 7/2009 |
| CN | 101499882 A | 8/2009 |
| CN | 101505498 A | 8/2009 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003506960 A | 2/2003 |
| JP | 2005277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008500766 A | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010516163 A | 5/2010 |
| JP | 2010519784 A | 6/2010 |
| JP | 2010536256 A | 11/2010 |
| JP | 2010541492 A | 12/2010 |
| JP | 2011505088 A | 2/2011 |
| JP | 2011505091 A | 2/2011 |
| JP | 2011507391 A | 3/2011 |
| JP | 2011516000 A | 5/2011 |
| JP | 2013502841 A | 1/2013 |
| KR | 20100018453 A | 2/2010 |
| RU | 2305902 C2 | 9/2007 |
| RU | 2007105748 A | 8/2008 |
| WO | 0111804 A1 | 2/2001 |
| WO | 2004066104 | 8/2004 |
| WO | WO-2004079949 A1 | 9/2004 |
| WO | WO-2005019705 A1 | 3/2005 |
| WO | WO-2005062798 A2 | 7/2005 |
| WO | 2005071867 | 8/2005 |
| WO | WO2005109705 | 11/2005 |
| WO | 2005125053 A1 | 12/2005 |
| WO | WO-2006020021 A1 | 2/2006 |
| WO | WO-2006099546 A1 | 9/2006 |
| WO | WO-2007080892 A1 | 7/2007 |
| WO | 2007097672 A1 | 8/2007 |
| WO | WO2007097671 A1 | 8/2007 |
| WO | WO2007108630 A1 | 9/2007 |
| WO | 2007129537 A1 | 11/2007 |
| WO | 2007129620 A1 | 11/2007 |
| WO | 2008024751 A2 | 2/2008 |
| WO | 2008040448 A1 | 4/2008 |
| WO | 2008041819 A2 | 4/2008 |
| WO | 2008057969 | 5/2008 |
| WO | 2008081816 A1 | 7/2008 |
| WO | 2008086517 | 7/2008 |
| WO | 2008093985 A1 | 8/2008 |
| WO | 2008116128 A2 | 9/2008 |
| WO | 2009011059 A1 | 1/2009 |
| WO | WO2009016260 A1 | 2/2009 |
| WO | WO-2009020926 A1 | 2/2009 |
| WO | WO2009022295 | 2/2009 |
| WO | WO2009038367 | 3/2009 |
| WO | 2009046061 A2 | 4/2009 |
| WO | 2009048246 A2 | 4/2009 |
| WO | WO2009043002 | 4/2009 |
| WO | WO2009062115 | 5/2009 |
| WO | WO2009064147 A2 | 5/2009 |
| WO | WO2009065075 A1 | 5/2009 |
| WO | 2009071583 A1 | 6/2009 |
| WO | 2009076803 A1 | 6/2009 |
| WO | WO-2009067842 A1 | 6/2009 |
| WO | WO2009078795 A1 | 6/2009 |
| WO | 2009089798 A1 | 7/2009 |
| WO | WO2009088251 A2 | 7/2009 |
| WO | WO2009096846 A1 | 8/2009 |
| WO | WO-2009126586 A2 | 10/2009 |
| WO | WO2009152866 A1 | 12/2009 |
| WO | WO-2010006285 A2 | 1/2010 |
| WO | WO-2010016607 A1 | 2/2010 |
| WO | WO2010016726 A2 | 2/2010 |
| WO | 2010032791 A1 | 3/2010 |
| WO | WO2010033957 A2 | 3/2010 |
| WO | 2010044903 A2 | 4/2010 |
| WO | 2010110840 A2 | 9/2010 |
| WO | WO2011034966 A1 | 3/2011 |

OTHER PUBLICATIONS

3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009, pp. 1-17, XP050377589.

3GPP: "3rd Generation Partnership Project; Technical Specification Group Radio Access Network; Further Advancements for E-UTRA Physical Layer Aspects(Release 9)", 3GPP Draft; TR 36.814_110, 3rd Generation Partnership Project (3GPP), Mobile Competence Centre ; 650, Route Des Lucioles ; F-06921 Sophia-Antipolis Cedex ; France, No. San Francisco, USA; May 9, 2009, pp. 1-34, XP050339706, [retrieved on May 9, 2009].

3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0,, [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.

"3rd Generation Partnership Project; Technical Specification Group Radio Access Network; Evolved Universal Terrestrial Radio Access (E-UTRA) and Evolved Uni versa1 Terrestria1 Radio Access Network (E-UTRAN); Overall description ; Stage 2 (Release 8)" 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V8.8.0, Mar. 1, 2009, pp. 1-157, XP050377583.

Ericsson: 3GPP Draft; R3-083577, 3rd Generation Partnership Project (3GPP), Mobile Competence Centre ; 650, Route Des Lucioles ; F-06921 Sophia-Antipolis Cedex ; France, No. Prague, Czech Republic; Nov. 25, 2008, XP050324756 [retrieved on Nov. 25, 2008] Section 10.1.5.1.

(56) References Cited

OTHER PUBLICATIONS

Ericsson: "Simultaneous reception of transport channels in the LTE", 3GPP Draft; 36302_CR0009_(REL-8) R2-093578, 3rd Generation Partnership Project (3GPP), Mobile Competence Centre ; 650, Route Des Lucioles ; F-06921 Sophia-Antipolis Cedex ; France, No. San Francisco, USA; May 9, 2009, pp. 1-3, XP050340488, [retrieved on May 9, 2009].
Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, No. Athens, Greece, Feb. 6, 2009, XP050318788.
Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL1/TSGR1_61/Docs/ [retrieved on Sep. 30, 2011].
Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, XP050351434 [retrieved on Aug. 18, 2009] p. 1, paragraph 1.
International Search Report and Written Opinion—PCT/US2010/ 038212—International Search Authority, European Patent Office, Dec. 15, 2010.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre ; 650, Route Des Lucioles ; F-06921 Sophia-Antipolis Cedex ; France, No. Prague, Czech Republic; Sep. 23, 2008, XP050320136, [retrieved on Sep. 23, 2008] the whole document.
Panasonic: "PDCCH with cross component carrier assignment", 3GPP Draft; R1-093597(Update of R1-093464), 3rd Generation Partnership Project (3GPP), Mobile Competence Centre ; 650, Route Des Lucioles ; F-06921 Sophia-Antipolis Cedex ; France, No. Shenzhen, China; Aug. 24, 2009, XP050388168, [retrieved on Aug. 22, 2009].
Partial International Search Report—PCT/US2010/038212—International Search Authority, European Patent Office, Nov. 4, 2010.
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, XP050351718 [retrieved on Aug. 18, 2009] p. 1, paragraph 1-paragraph 2.
QUALCOMM Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, No. San Francisco, USA; May 8, 2009, XP050339658, [retrieved on May 8, 2009].
QUALCOMM Inc., "Introduction of time domain ICIC", R2-106943, 3GPP TSG-RAN WG2 Meeting #72, Jacksonville, US, Nov. 15-19, 2010, pp. 4.
QUALCOMM Inc., "RRM/RLM resource restriction for time domain ICIC", R2-110698, 3GPP TSG-RAN WG2 Meeting #72-bis, Dublin, Ireland, Jan. 17-21, 2011, pp. 8.
QUALCOMM Incorporated: "Extending Rel-8/9 ICIC into Rel-10", 3GPP Draft; R1-101505 Extending REL-8-9 ICIC Into REL-10, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Feb. 22, 2010, Feb. 16, 2010, XP050418951, [retrieved on Feb. 16, 2010].
Samsung: "Clarification on the parallel receptions for PDSCHs", 3GPP Draft; 36302_CR0010 (REL-8) R2-093579, 3rd Generation Partnership Project (3GPP), Mobile Competence Centre ; 650, Route Des Lucioles ; F-06921 Sophia-Antipolis Cedex ; France, No. San Francisco, USA; May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, No. Shenzhen, China; Aug. 19, 2009, XP050351683 [retrieved on Aug. 19, 2009] p. 1, paragraph 1.
Samsung: "Inbound mobility to H(e)NBs" 3GPP Draft; R2-093250_ Inb0und Mobility to H(E)NBS-R4, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050340933 [retrieved on Apr. 28, 2009] the whole document.
Vice Chairman: "Report of E-UTRA control plane session" 3GPP Draft; R2-082841—Chair-Report-RAN2-62-LTE-CP, 3rd Generation Partnership Project (3GPP), Mobile Competence Centre ; 650, Route Des Lucioles ; F-06921 Sophia-Antipolis Cedex ; France, v o 1 . RAN WG2, No. Kansas City, USA; May 14, 2008, XP050140403 [retrieved on May 14, 2008].
Written Opinion—PCT/US2011/041643, ISA/EPO—Oct. 18, 2011.
Young Jin Sang, et al., "A Self-Organized Femtocell for IEEE 802. 16e System", Global Telecommunications Conference, 2009. GLOBECOM 2009. IEEE, IEEE, Piscataway, NJ, USA, Nov. 30, 2009, pp. 1-5, XP031646102, ISBN: 978-1-4244-4148-8.
Gale et al., "Distributed discreate resource optimization in Heterogeneous networks". 2008, pp. 560-564, IEEE 04641670.
Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 12, 2010, Apr. 6, 2010, XP050419318, [retrieved on Apr. 6, 2010].
Inoue et al., "Space time transmit site diversity for OFDM multi base station system", 2002, pp. 30-34, IEEE 01045691.
3GPP: "LS on RV Determination for BCCH," 3GPP TSG RAN WG1 Meeting #54bis, Sep. 29, 2008, R1-084067, <URL: http://www. 3gpp.org/ftp/tsg_ran/WG1_RL1/TSGR1_54b/Docs/R1-084067. zip>.
3GPP TSG-RAN WG2 Meeting #68 R2-096531, "Email discussion on MBMS value range [67b#14]", Nov. 9-13, 2009, Jeju, Korea, Discussion and Decision, <URL: http://www.3gpp.org/ftp/tsg_ran/ WG2_RL2/TSGR2_68/Docs/R2-096531.zip>, page No. 1-13.
CATT,Addition of MBSFN information on X2 interface,[online],3GPPTSG-RAN3 Meeting #64,May 4, 2009,R3-091247,Internet<URL:http://www.3gpp.org/ftp/tsg_ran/WG3_lu/ TSGR3_64/Docs/R3-091247.zip>, page No. 1-14.
LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol . RAN WGI, No. San Francisco, USA; Feb. 22, 2010-Feb. 26, 2010, Feb. 16, 2010, XP050418854, pp. 1-5.
Motorola: "DCI Format 1C with implicit RV and TBS," 3GPP TSG RAN1 #54, Aug. 18, 2008, R1-083207, 5 pages, <URL:http://www. 3gpp.org/ftp/tsg_ran/WG1_RL1/TSGR1_54/Docs/R1-083207. zip>.
NTT Docomo: "Downlink Interference Coordination Between eNodeB and Home eNodeB", 36PP Draft; R1-101225 HENB_ICIC, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010, XP050418740, [retrieved on Feb. 16, 2010]., p. 1-8.

(56) References Cited

OTHER PUBLICATIONS

Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, No. Ljubljana, Jan. 7, 2009, XP050318205, pp. 1-5, [retrieved on Jan. 7, 2009].
Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip.
Taiwan Search Report—TW099118958—TIPO—May 29, 2013.
3GPP TS 36.331 V8.5.0, Radio Resource Control (RRC); Protocol specification (Release 8), 204 pages, 2009.
Alcatel-Lucent Shanghai Bell et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France, No. Los Angeles, USA; Jun. 24, 2009, XP050350848, [retrieved on Jun. 24, 2009].
Ericsson: "Structure of System Information", TSGR2#4(99)414, 5 pages, May 1999.
Garcia F., et al.,"Design of a slew rate controlled output buffer", ASIC Conference 1998. Proceedings. Eleventh Annual IEEE International Rochester, NY, USA Sep. 13-16, 1998, New York, NY, USA.IEEE, US, Sep. 13, 1998, pp. 147-150, XP010309693, DOI: 10.1109/ASIC.1998.722821 ISBN: 978-0-7803-4980-3.
Huawei: "Discussion on OTDOA based positioning issue", 3GPP Draft; R1-092355, 3rd Generation Partnership Project (3GPP), Mobile Competence Centre; 650, Route Des Lucioles; F-06921 Sophia-Antipolis Cedex; France, No. Los Angeles, USA, Jun. 24, 2009, XP050350879, [retrieved on Jun. 24, 2009].
3GPP TS 36.355 V9.0.0, Technical Specification Group Radio Access Network, E-UTRA, "LTE Positioning Protocal (LLP) (Release 9)" Dec. 2009, 31 pages.
Alcatel-Lucent, "Interference Coordination Framework with Results", 3GPP TSG RAN WG1 Meeting #49bis, R1-07-3187, Jun. 29, 2007, pp. 1-9.
Huawei, "Consideration on CSI-RS design for CoMP and text proposal to 36.814", 3GPP TSG-RAN WG1#57b R1-092364, Los Angeles, USA, Jun. 29-Jul. 3, 2009.
LG Electronics: "Coordination for DL control channel in co-channel HeNB deployment", 3GPP Draft;R1-102429 Control Channel in Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 6, 2010, XP050419640, [retrieved on Apr. 6, 2010].
NTT Docomo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 7, 2010, XP050419698, [retrieved on Apr. 7, 2010].
NTT Docomo, "Performance Evaluations of Heterogeneous Networks", 3GPP TSG RAN WG1 Meeting #60, R1-101226, Feb. 26, 2010, pp. 1-18.
QUALCOMM Europe: "Coordinated Multi-Point downlink transmission in LTE-Advanced" 3GPP Draft; R1-084400 Comp, 3rd Generation Partnership Project (3GPP), Mobile Competence Centre; 650, Route Des Lucioles ; F-06921 Sophia-Antipolis Cedex; France, No. Prague, Czech Republic; Nov. 5, 2008, XP050317663.
3GPP TSG RAN WG2 #62bis, Ericsson, E-UTRA UE Radio Measurement Reporting for Uplink ICIC, R2-083147, Jul. 2008, http://www.3gpp.org/FTP/tsg_ran/WG2_RL2/TSGR2_62bis/Docs/R2-083147.zip.
Ericsson: Considerations on Non-CA based Heterogeneous Deployments, 3GPP TSG-RAN WG1 #61, R1-102618, ST-Ericsson, 2010, 3 Pages.
Gaie C., et al., "Distributed Discrete Resource Optimization in Heterogeneous Networks," IEEE, 2008, pp. 560-564.
Interdigital Communications: "eICIC Macro-Femto: Time-domain muting and ABS", 3GPP TSG-RAN WG1#63, R1-105951, Nov. 15 2010, 6 Pages, URL: http://www.3gpp.org/ftp/tsg_ran/WG1_RL1/TSGR1_63/Docs/R1-105951.zip.
LG Electronics: Coordination for DL Control Channel in Co-Channel CSG Deployment, 3GPP TSG RAN WG1 Meeting #61, R1-102704, 2010, 8 Pages.
LG-Nortel: "Interference under Type 1 RN", 3GPP TSG-RAN WG1#57, R1-092184, 14 pages, May 4, 2009.
Qualcomm Europe, "Carrier Aggregation in Heterogeneous Networks", 3GPP TSG RAN WG1 #56bis, R1-091459, pp. 1-12, Seoul, Korea, Mar. 23-27, 2009.
US 8,583,133, 11/2013, Ji et al. (withdrawn)

\* cited by examiner

SYSTEMS, APPARATUS AND METHODS FOR COMMUNICATING DOWNLINK INFORMATION

CROSS-REFERENCE TO RELATED APPLICATIONS

This application claims the benefit of U.S. Provisional Patent Application Ser. No. 61/185,727, filed Jun. 10, 2009, which is titled "System and Method for Sending System Information," and the entire contents of which are incorporated herein by reference.

BACKGROUND

I. Field

The following description relates to wireless communications, in general, and to systems, methods and apparatus for sending information in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs.

For cells providing varying transmit powering and/or operating with UEs according to rules of restricted association, the BS in the cell can conduct balance loading by offloading one or more UEs from one cell to a different cell. However, due to interference on the DL, the UE may experience difficulty in decoding system and/or paging information on the DL, which is typically transmitted over the DL shared data channel. In some embodiments, the UE cannot decode the DL control channel. The DL control channels, including, but not limited to, the Physical Control Format Indicator Channel (PCFICH) and the Physical Downlink Control Channel (PDCCH), can signal how many control symbols are used in each transmission timing interval (TTI) and/or the resource allocation for the associated DL data channels.

In Long-Term Evolution (LTE) Release 8 wireless communication systems, the PDCCH format 1A or 1C can be used to signal resource allocation for paging, system information updates and/or random access responses. A limited number of payload sizes have been specified for those cases, and Quadrature Phase Shift Keying (QPSK) modulation can be used regardless of the modulation and coding scheme (MCS). When there is strong interference, the UE may apply interference cancellation or other advanced receiver to decode control and data. However, this solution requires the UE to decode the control channel to decode the data channel. Accordingly, due to such requirements, novel systems, apparatus and methods for sending information in wireless communication systems are therefore desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with sending information over DL channels.

According to related aspects, a method is provided. The method can include receiving a signal indicative of a base station enabling or disabling a function, wherein the function is configured to transmit information carried in control channels using selected downlink information; receiving the selected downlink information at one or more locations; and determining a resource allocation of at least one of paging information or system information or unicast data information based, at least, on the selected downlink information. The determining can be performed without decoding control channels corresponding to the selected downlink information in response to receiving a signal indicative of the function being enabled.

According to other related aspects, a computer program product is provided. The computer program product can include a computer-readable medium including a first set of codes for causing a computer to receive a signal indicative of a base station enabling or disabling a function, wherein the function is configured to transmit information carried in control channels using selected downlink information; a second set of codes for causing the computer to receive the selected downlink information at one or more locations; and a third set of codes for causing the computer to determine a resource allocation of at least one of paging information or system information or unicast data information based, at least, on the selected downlink information, wherein the determining is performed without decoding control channels corresponding to the selected downlink information in response to receiving a signal indicative of the function being enabled.

According to other related aspects, an apparatus is provided. The comprising: means for receiving a signal indicative of a base station enabling or disabling a function, wherein the function is configured to transmit information carried in control channels using selected downlink information means for receiving the selected downlink information at one or more locations; and means for determining a resource allocation of at least one of paging information or system information or unicast data information based, at least, on the selected downlink information, wherein the determining is performed without decoding control channels corresponding to the selected downlink information in response to receiving a signal indicative of the function being enabled.

According to other related aspects, another apparatus is provided. The apparatus can include a resource allocation module configured to: receive a signal indicative of a base station enabling or disabling a function, wherein the function is configured to transmit information carried in control channels using selected downlink information; receive the selected downlink information at one or more locations; and determine a resource allocation of at least one of paging information or system information or unicast data information based, at least, on the selected downlink information, wherein the determining is performed without decoding control channels corresponding to the selected downlink information in response to receiving a signal indicative of the function being enabled.

According to other related aspects, another method is provided. The method can include transmitting a signal indicative of enabling or disabling a function, wherein the function is configured to transmit information carried in control channels using selected downlink information; and transmitting the selected downlink information at one or more locations, wherein the selected downlink information is configured to enable a user equipment to determine a resource allocation of at least one of paging information or system information or unicast data information based, at least, on the selected downlink information, wherein the determining is performed without decoding a control channel corresponding to the selected downlink information in response to transmitting a signal indicative of the function being enabled.

According to other related aspects, another computer program product is provided. The computer program product can include a computer-readable medium, comprising: a first set of codes for causing the computer to transmit a signal indicative of enabling or disabling a function, wherein the function is configured to transmit information carried in control channels using selected downlink information; and a second set of codes for causing the computer to transmit the selected downlink information at one or more locations, wherein the selected downlink information is configured to enable a user equipment to determine a resource allocation of at least one of paging information or system information or unicast data information based, at least, on the selected downlink information, wherein the determining is performed without decoding a control channel corresponding to the selected downlink information in response to transmitting a signal indicative of the function being enabled.

According to other related aspects, another apparatus is provided. The apparatus can include means for transmitting a signal indicative of enabling or disabling a function, wherein the function is configured to transmit information carried in control channels using selected downlink information; and means for transmitting the selected downlink information at one or more locations, wherein the selected downlink information is configured to enable a user equipment to determine a resource allocation of at least one of paging information or system information or unicast data information based, at least, on the selected downlink information, wherein the determining is performed without decoding a control channel corresponding to the selected downlink information in response to transmitting a signal indicative of the function being enabled.

According to other related aspects, another apparatus is provided. The apparatus can include a resource allocation module configured to: transmit a signal indicative of enabling or disabling a function, wherein the function is configured to transmit information carried in control channels using selected downlink information; and transmit the selected downlink information at one or more locations, wherein the selected downlink information is configured to enable a user equipment to determine a resource allocation of at least one of paging information or system information or unicast data information based, at least, on the selected downlink information, wherein the determining is performed without decoding a control channel corresponding to the selected downlink information in response to transmitting a signal indicative of the function being enabled.

According to other related aspects, another method is provided. The method can include receiving a signal indicative of coordinated information, wherein the coordinated information includes paging information and system information; and performing processing using a same physical resource based, at least, on the coordinated information.

According to other related aspects, another computer program product is provided. The computer program product, comprises a computer-readable medium, comprising: a first set of codes for causing a computer to receive a signal indicative of coordinated information, wherein the coordinated information includes paging information and system information; and a second set of codes for causing a computer to perform processing using a same physical resource based, at least, on the coordinated information.

According to other related aspects, another apparatus is provided. The apparatus can include: means for receiving a signal indicative of coordinated information, wherein the coordinated information includes paging information and system information; and means for performing processing using a same physical resource based, at least, on the coordinated information.

According to other related aspects, another apparatus is provided. The apparatus can include a resource allocation module configured to: receive a signal indicative of coordinated information, wherein the coordinated information includes paging information and system information; and perform processing using a same physical resource based, at least, on the coordinated information.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
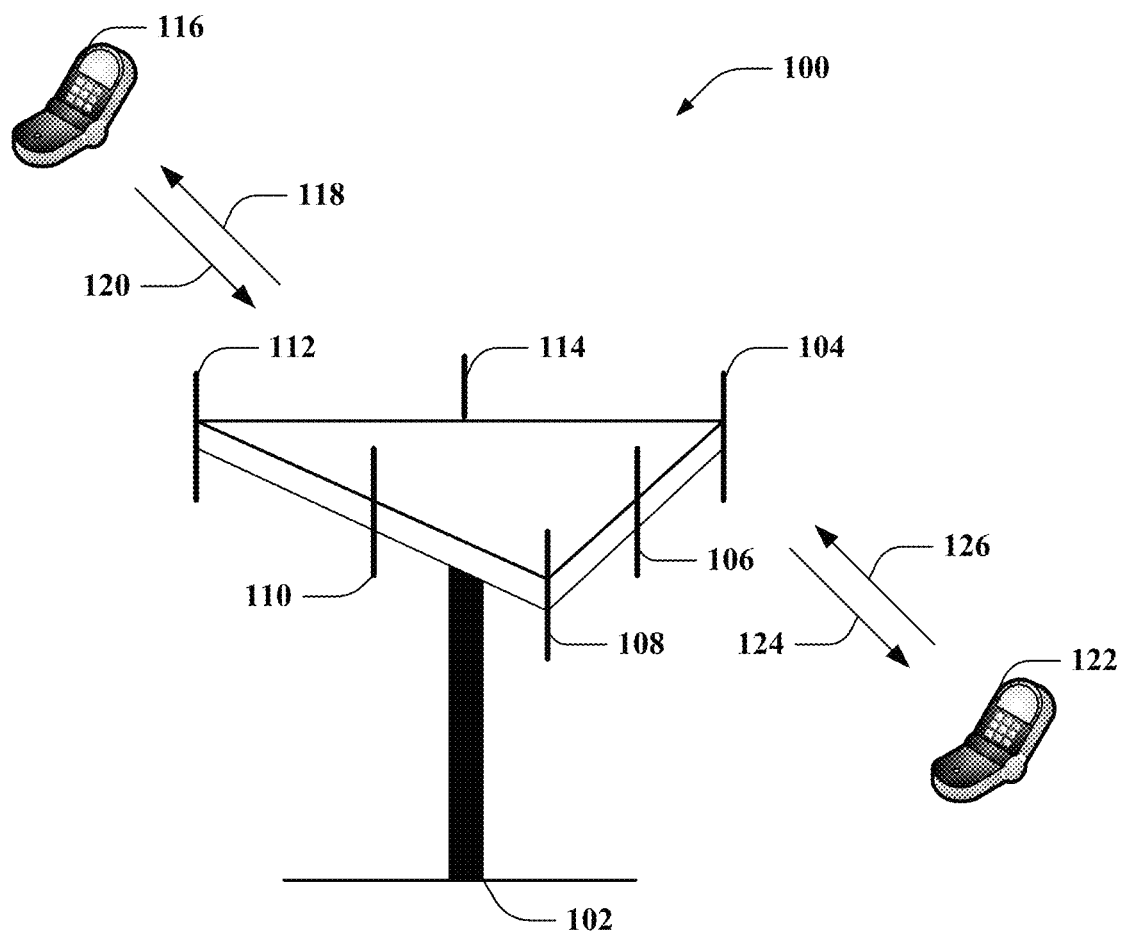
FIG. 1 is an illustration of an example wireless communication system facilitating communication of DL information in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

FIG. 1 is an illustration of an example wireless communication system facilitating communication of DL information in accordance with various aspects set forth herein. In wireless communication system 100, interference caused by transmissions on the UL can be managed by the BS 102 while interference caused by transmissions on the DL can be managed by the UEs 116, 122.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs. Further, the BS 102 and UEs 116, 122 can be configured providing configuration of scheduling policy for facilitating distributed scheduling as described herein.

Figure 2:
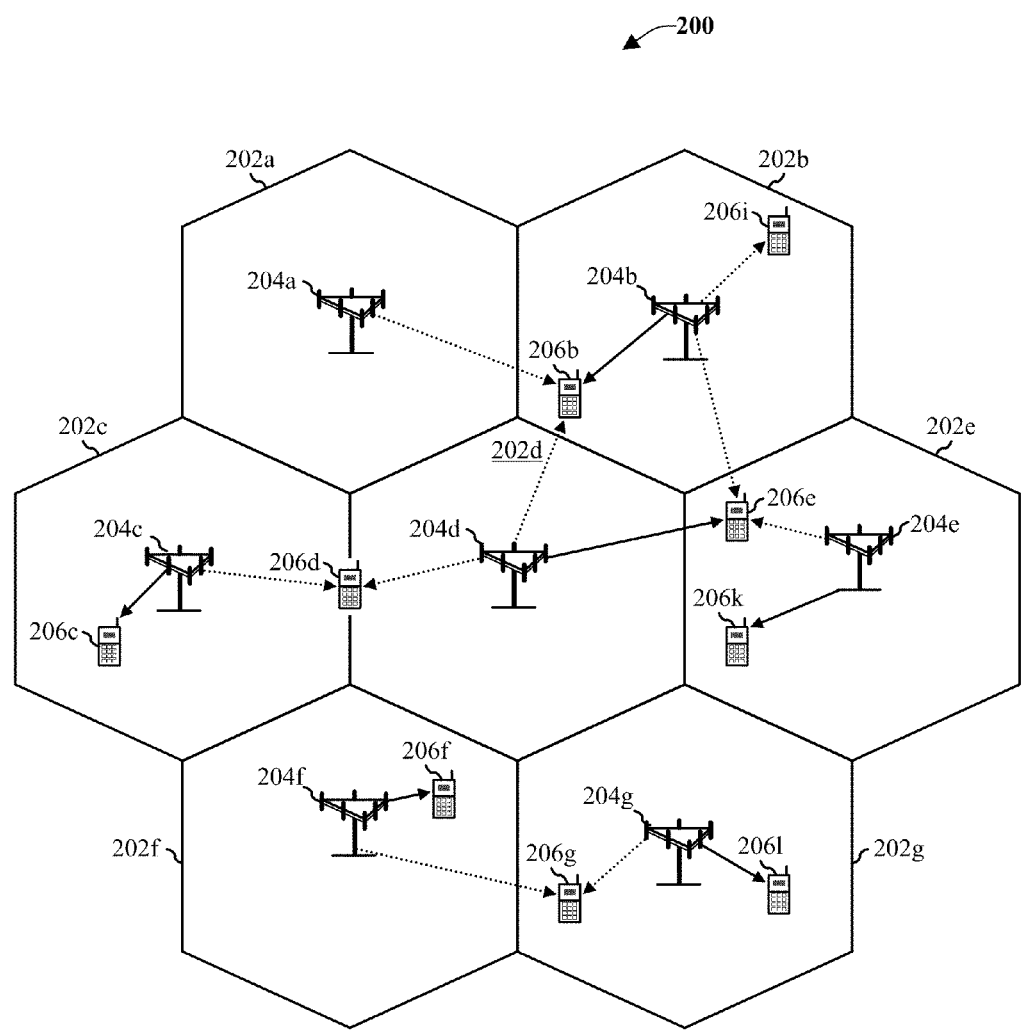
FIG. 2 is an illustration of another example wireless communication system facilitating communication of DL information in accordance with various aspects set forth herein.

FIG. 2 is an illustration of another example wireless communication system facilitating communication of DL information in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The wireless communication system 200 may provide service over a large geographic region. For example, macro cells 202A-202G may cover a few blocks in a neighborhood.

Figure 3:
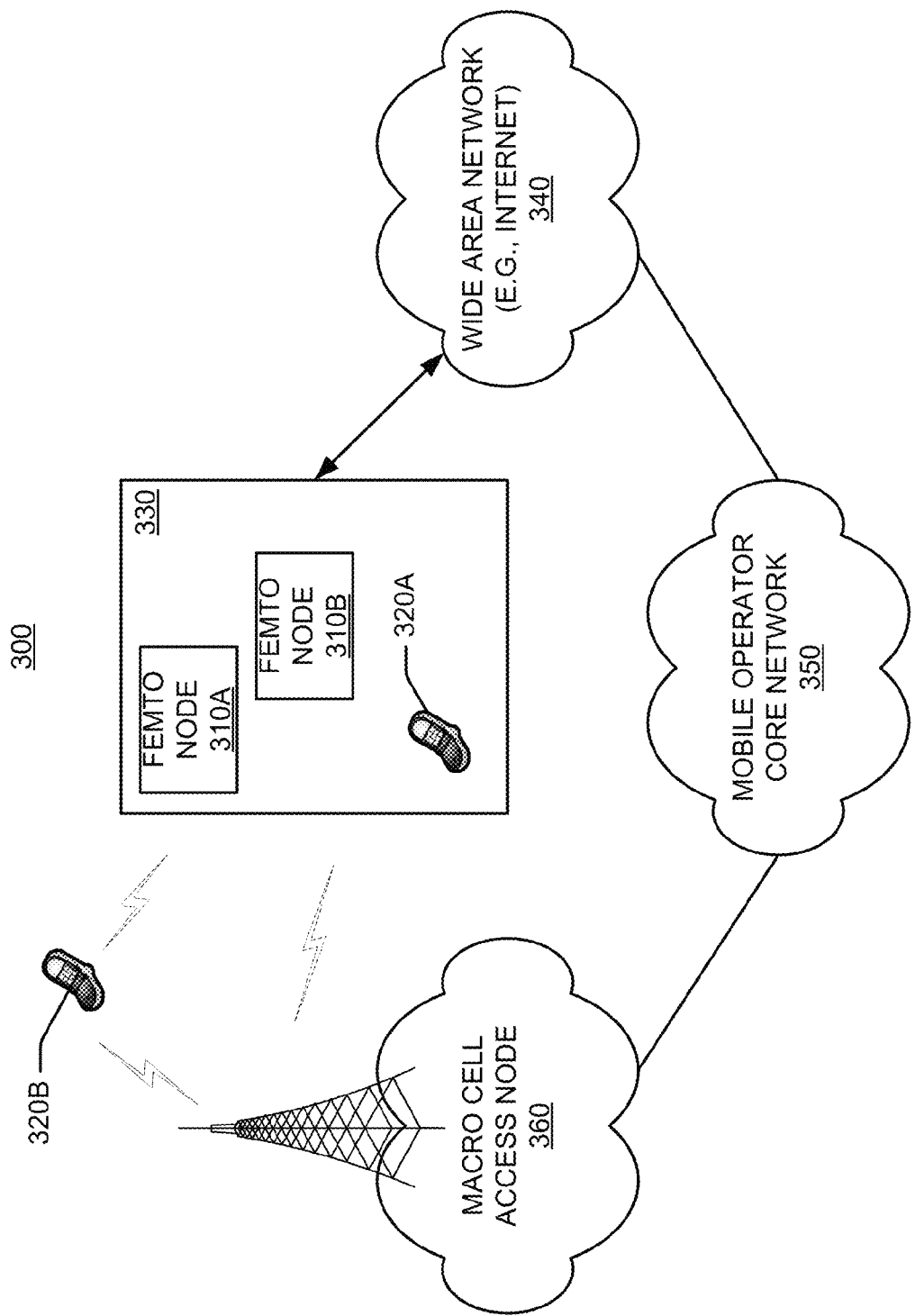
FIG. 3 is an illustration of an example wireless communication system where one or more Femto nodes are deployed for facilitating communication of DL information in accordance with various aspects set forth herein.

FIG. 3 is an illustration of an example wireless communication system where one or more Femto nodes are deployed for facilitating communication of DL information in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B. In embodiments, interference management can be facilitated in the system 300 as described herein.

Figure 4:
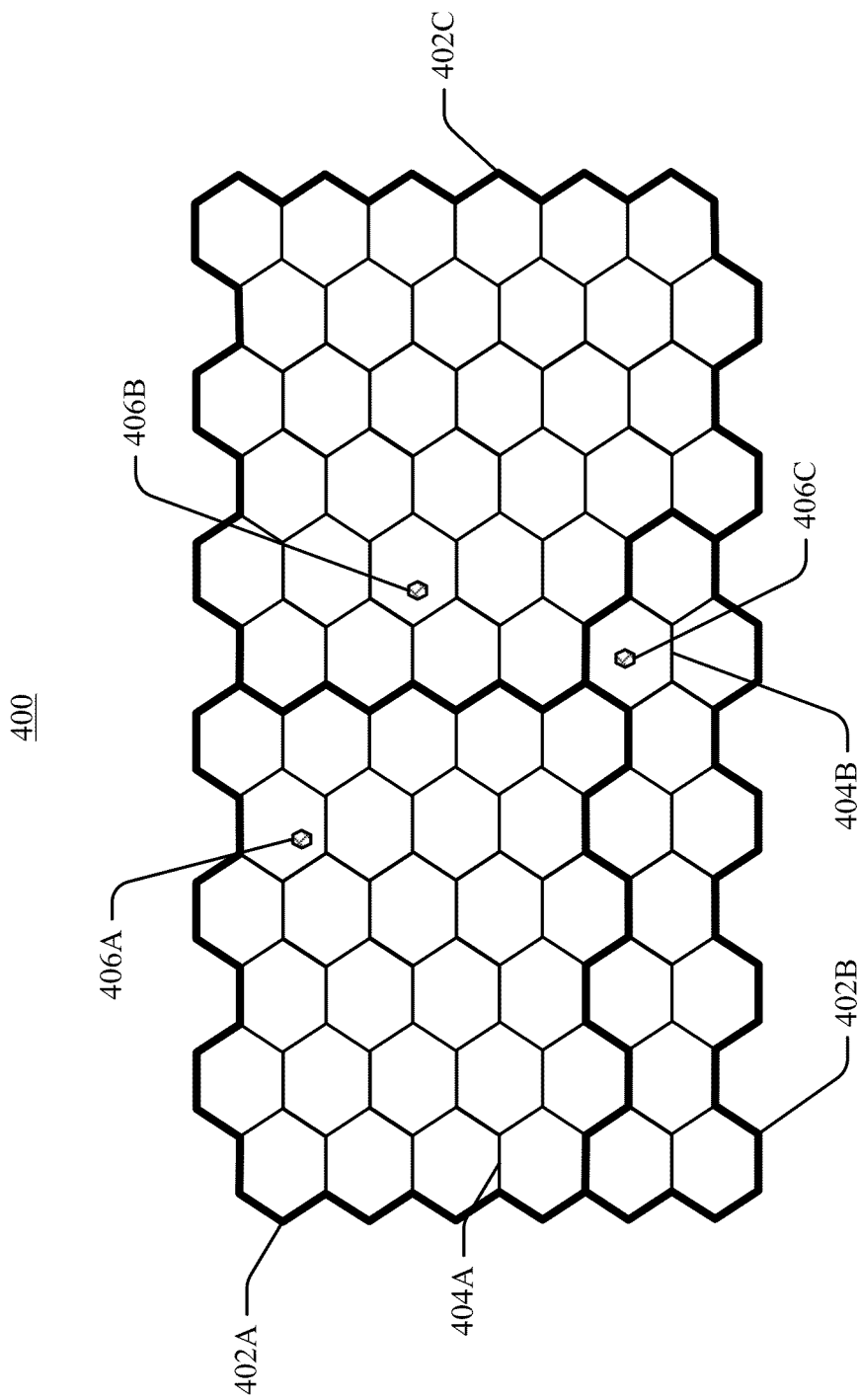
FIG. 4 is an illustration of an example coverage map in a wireless communication system for facilitating communication of DL information in accordance with various aspects set forth herein.

FIG. 4 is an illustration of an example coverage map in a wireless communication system for facilitating communication of DL information in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro access node (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

A wireless multiple-access communication system can simultaneously support communication for multiple wireless UEs. As mentioned above, each UE can communicate with one or more BSs via transmissions on the DL or the UL. These communication links (i.e., DL and UL) may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system can support TDD and FDD. In a TDD system, the DL and UL transmissions can be on the same frequency region so that the reciprocity principle allows the estimation of the DL channel from the UL. This enables the BS to transmit beam-forming gain on the DL when multiple antennas are available at the BS. In some embodiments, the channel conditions of the UL channel can be estimated from the DL channel, for interference management, as described herein.

Figure 5:
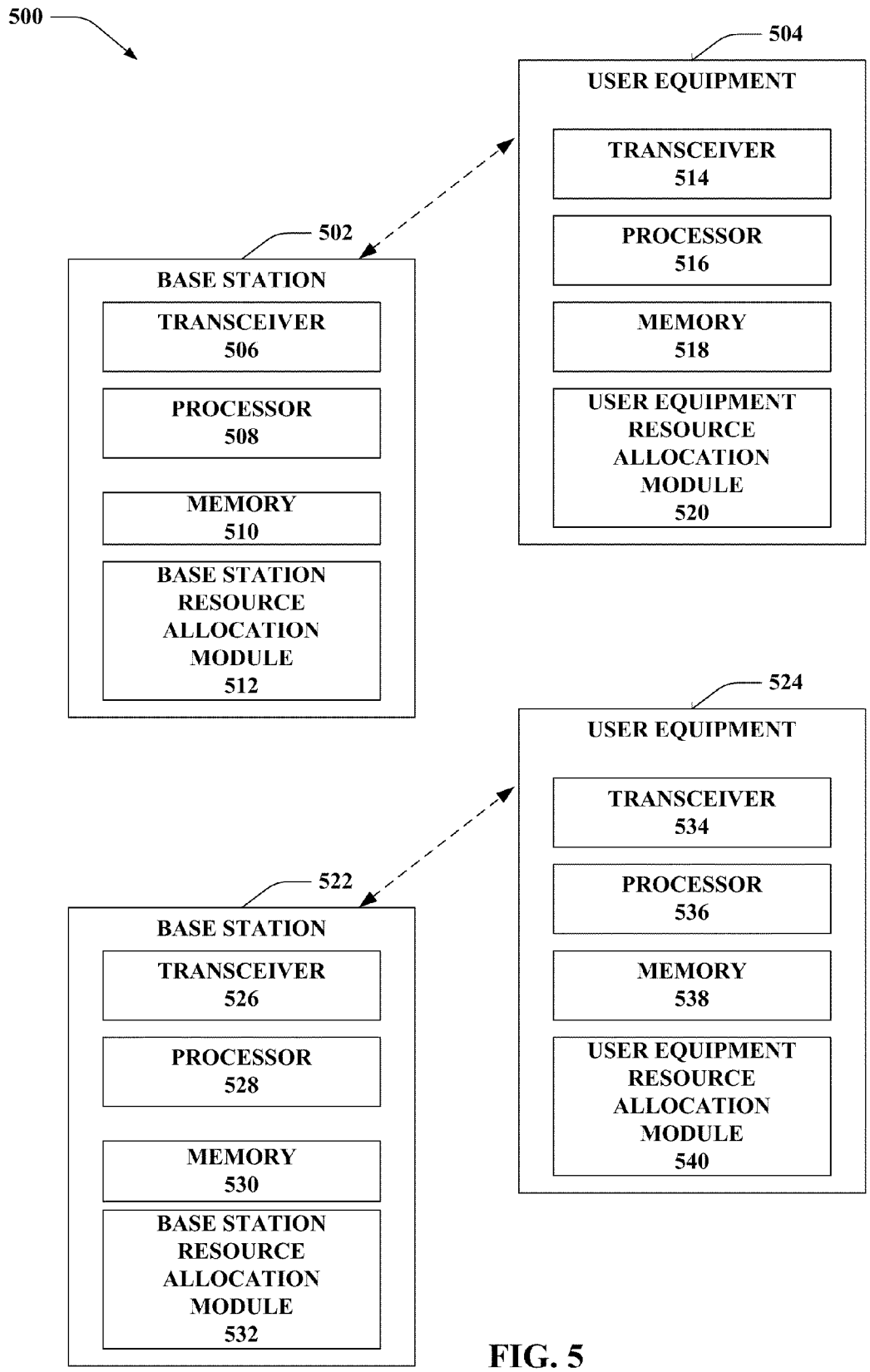
FIG. 5 is an illustration of an example block diagram of a wireless communication system for facilitating communication of DL information in accordance with various aspects set forth herein.

FIG. 5 is an illustration of an example block diagram of a wireless communication system for facilitating communication of DL information in accordance with various aspects set forth herein.

In the embodiments described, the BSs 502, 522 can enable or disable a function enabling the BSs 502, 522 to send DL system information, paging information, unicast data information and/or a random access response without using control channel information. As such, the UEs 504, 524 that receive the DL information do not need to decode control channels to decode a corresponding data channel.

In some embodiments, the BSs 502, 522 can transmit control information for paging information and/or system information as in LTE Release 8 systems.

The wireless communication system 500 can include BSs 502, 522 and UEs 504, 524 served by BS 502, 522, respectively. BSs 502, 522 can be located in different cells in various embodiments transmit paging, system and/or unicast data information at one or more locations based on one or more of any combinations of a cell identity, a system frame number, a cyclic prefix type, a number of transmit antenna, and/or a closed subscriber group flag.

The BS 502, 522 can transmit the information at a plurality of locations. In some embodiments, the locations to which the information is transmitted can be unique. In some embodiments, the locations are not unique. In various embodiments, the UE 504, 524 knows the plurality of locations and can apply blind decoding to decode the right location.

The information transmitted by the BSs 502, 522 can be employed by the UE 504, 524 to determine the information carried in control channels. In various embodiments, the information carried in the control channels can include, but is not limited to, resource allocation information, information indicative of a start symbol for data, hybrid automatic repeat request identification information, information indicative of a number of control symbols and/or other control information. The information transmitted by the BS 502, 522 can be transmitted by the physical control format indicator channel and/or the physical downlink control channel in various embodiments.

The BSs 502, 522 can inform the UEs 504, 524 through signaling on the reference signal, primary synchronization signal, secondary synchronization signal, pseudorandom sequence, reference signal, physical broadcast channel and/or other physical signal and/or channel.

In some embodiments, the BSs 502, 522 can coordinate the transmission of the paging information and/or the system information. The coordination can be such that the same physical resource is used to facilitate interference cancellation and/or joint detection at UEs 504, 524. In some embodiments, the BSs 502, 522 can use a combination of the methods described herein.

Referring specifically to FIG. 5, in the embodiment shown, BSs 502, 522 can include transceivers 506, 526 configured to transmit and receive data and/or control information and/or any other type of information described herein with reference to any of the systems, methods, apparatus and/or computer program products to and from BSs 502, 522, respectively. Transceivers 506, 526 can be configured to transmit data and control channel information. In various embodiments, the transceivers 506, 526 can transmit downlink information at one or more locations. The transmitted information can be detected by the UE 504, 524. In some embodiments, the UE 504, 524 can detect the downlink information using blind decoding.

BSs 502, 522 can also include processors 508, 528 and memory 510, 530. Processors 508, 528 can be configured to perform one or more of the functions described herein with reference to any of the systems, methods, apparatus and/or computer program products. The BSs 502, 522 can include memory 510, 530, respectively. The memory 510, 530 can be for storing computer-executable instructions and/or information for performing the functions described herein with reference to any of the systems, methods, apparatus and/or computer program products.

BSs 502, 522 can also include BS resource allocation modules 512, 532 configured to allocate resources including, but not limited to, paging information, system information and/or unicast data information. The BS resource allocation modules 512, 532 can allocate the resources to a UE 504, 524 by transmitting the selected downlink information. In some embodiments, the BS resource allocation modules 512, 532 can transmit a signal indicative of enabling or disabling a function, wherein the function is configured to transmit information carried in control channels using selected downlink information. The BS 502, 522 can also transmit the selected downlink information at one or more locations, wherein the selected downlink information is configured to enable a UE to determine a resource allocation of at least one of paging information or system information or unicast data information based, at least, on the selected downlink information. In some embodiments, the determination is made by the UEs 504 524 without decoding control channels corresponding to the selected downlink information, and in response to the BSs 502, 522 transmitting a signal to the UEs 504, 524 that is indicative of the function being enabled.

In some embodiments, the selected downlink information is information indicative of at least one of a cell identity, a system frame number, a cyclic prefix type or a closed subscriber group.

In some embodiments, the selected downlink information is transmitted on at least one of the physical control format indicator channel or the physical downlink control channel. In some embodiments, the one or more locations are not unique to one another. In some embodiments, at least one of a physical broadcast channel, a reference signal, a primary synchronization signal, a secondary synchronization signal, a primary broadcast channel or other physical signal includes the signal indicative of enabling or disabling a function.

With regard to the UEs 504, 524, the UEs 504, 524 can be configured to determine the resource allocation of paging, system and/or unicast data information. If the function is enabled, the resource allocation can be based, at least, on various parameters and the UEs 504, 524 do not need to decode control channels to get the resource allocation information. In various embodiments, the parameters can include, but are not limited to, a cell identity, a system frame number, a cyclic prefix type, a number of transmit antenna, and/or a closed subscriber group flag.

The parameters can be transmitted at different locations. If the locations are not unique, the UEs 504, 524 can be configured to attempt to decode the various channels at all possible locations employing blind decoding. The UEs 504, 524 can also be configured to decode control channels to decode the associated data channel, as is the case for UEs being configured according to the LTE Release 8 specification.

Referring specifically to FIG. 5 again, UEs 504, 524 can include transceivers 514, 534 configured to transmit and receive data and/or control information and/or any other type of information described herein with reference to any of the systems, methods, apparatus and/or computer program products to and from BSs 502, 522, respectively. Transceivers 514, 534 can be configured to receive data and control channels and/or information thereon.

UEs 504, 524 can also include processors 516, 536 and memory 518, 538. Processors 516, 536 can be configured to perform one or more of the functions described herein with reference to any of the systems, methods, apparatus and/or computer program products. The UEs 504, 524 can include memory 518, 538 respectively. The memory 518, 538 can be for storing computer-executable instructions and/or information for performing the functions described herein with reference to any of the systems, methods, apparatus and/or computer program products.

UEs 504, 524 can also include UE resource allocation modules 520, 540 configured to receive and process information carried in control channels including, but not limited to, resource allocation information, paging information, system information and/or unicast data information. UE resource allocation modules 520, 540 can also be configured to process data and/or control information according to the resource allocations received from the BSs 502, 522, respectively.

In some embodiments, the UE resource allocation modules 520, 540 are configured to receive a signal indicative of a base station enabling or disabling a function, wherein the function is configured to transmit information carried in control channels using selected downlink information. The UE resource allocation modules 520, 540 can also be configured to receive the selected downlink information at one or more locations, and determine a resource allocation of at least one of paging information or system information or unicast data information based, at least, on the selected downlink information. In some embodiments, the determining is performed without decoding control channels corresponding to the selected downlink information, and in response to receiving a signal indicative of the function being enabled.

In some embodiments, the selected downlink information is information indicative of at least one of a cell identity, a system frame number, a cyclic prefix type or a closed subscriber group. In some embodiments, the selected downlink information is received on at least one of the physical control format indicator channel or the physical downlink control channel.

In some embodiments, receiving downlink information comprises blind decoding at the one or more locations based, at least, on receiving the selected downlink information at least two of the one or more locations.

In some embodiments, at least one of a physical broadcast channel, primary synchronization signal, secondary synchronization signal, a reference signal, pseudorandom sequence and/or other physical signal includes the signal indicative of enabling or disabling a function.

In some embodiments, the UE resource allocation modules 520, 540 are configured to, receive a signal indicative of coordinated information. The coordinated information can include at least two of paging, system information and/or unicast data information. The UE resource allocation modules 520, 540 can also be configured to perform processing using a same physical resource based, at least, on the coordinated information. In some embodiments, the processing comprises interference cancellation. In some embodiments, the processing comprises joint detection.

Figure 6:
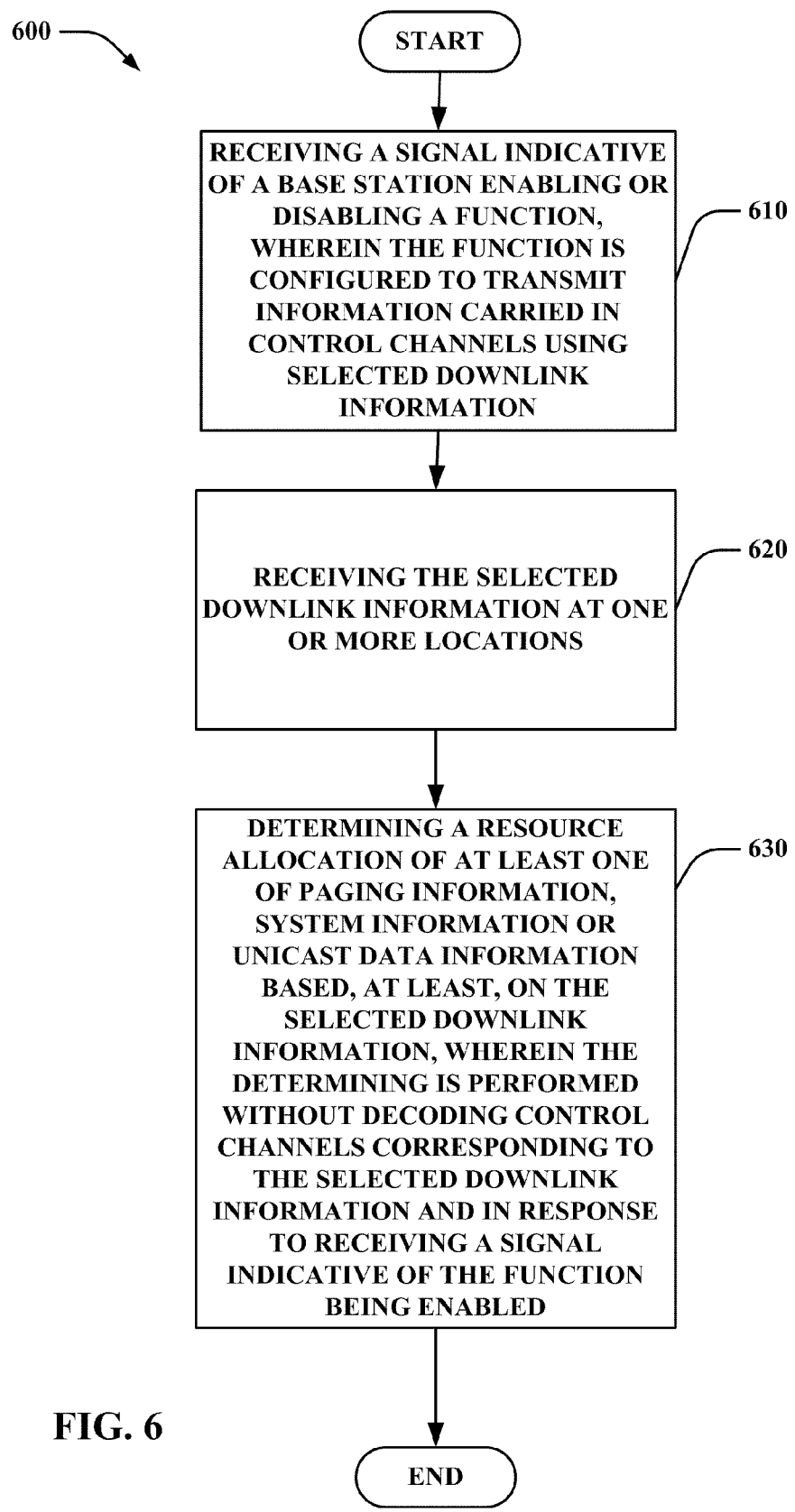
FIG. 6 is an illustration of an example of a flowchart of a method for facilitating communication of DL information in accordance with various aspects set forth herein.

FIG. 6 is a flowchart of a method for facilitating communication of DL information in accordance with various aspects set forth herein.

At 610, method 600 can include a UE receiving a signal indicative of a BS enabling or disabling a function. In some embodiments, the function is configured to transmit information carried in the control channel using selected downlink information.

At 620, method 600 can include receiving the selected downlink information at one or more locations.

At 630, method 600 can include determining a resource allocation of at least one of paging information or system information or unicast data information based, at least, on the selected downlink information. In some embodiments, determining is performed without decoding control channels corresponding to the selected downlink information and in response to receiving a signal indicative of the function being enabled.

In various embodiments, the control channels that the UE does not need to decode include the physical control format indicator channel and/or the physical downlink control channel. The physical control format indicator channel can inform the UE of the start symbol for the data, and the physical downlink control channel can inform the UE of the resource allocation, hybrid automatic repeat request identification information and/or other control information.

In some embodiments, the selected downlink information is information indicative of at least one of a cell identity, a system frame number, a cyclic prefix type or a closed subscriber group.

In some embodiments, receiving downlink information comprises blind decoding at the one or more locations based, at least, on receiving the selected downlink information at least two of the one or more locations.

In some embodiments, at least one of a physical broadcast channel, primary synchronization signal, a secondary synchronization signal, a pseudorandom sequence, a reference signal and/or another physical signal or channel includes the signal indicative of enabling or disabling a function.

Figure 7:
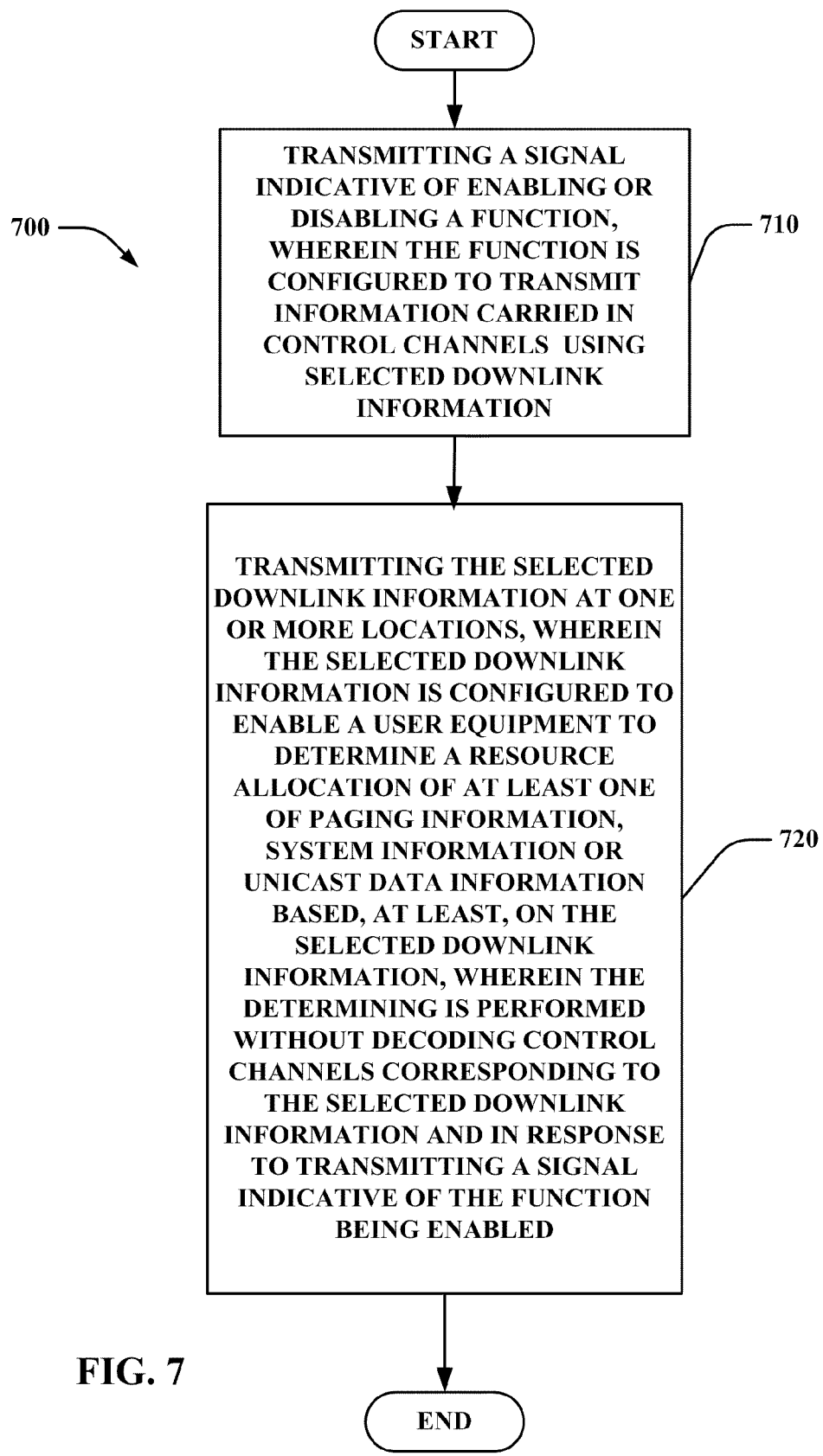
FIG. 7 is an illustration of an example of a flowchart of a method for facilitating communication of DL information in accordance with various aspects set forth herein.

FIG. 7 is a flowchart of a method for facilitating communication of DL information in accordance with various aspects set forth herein.

At 710, method 700 can include transmitting a signal indicative of enabling or disabling a function, wherein the function is configured to transmit information carried in the control channels using selected downlink information.

At 720, method 700 can include transmitting the selected downlink information at one or more locations. In some embodiments, the selected downlink information is configured to enable a user equipment to determine a resource allocation of at least one of paging information or system information or unicast data information based, at least, on the selected downlink information, wherein the determining is performed without decoding control channels corresponding to the selected downlink information in response to transmitting a signal indicative of the function being enabled. The physical control format indicator channel can inform the UE of the start symbol for the data, and the physical downlink control channel can inform the UE of the resource allocation, hybrid automatic repeat request identification information and/or other control information.

In some embodiments, the selected downlink information is information indicative of at least one of a cell identity, a system frame number, a cyclic prefix type or a closed subscriber group.

In some embodiments, the one or more locations are not unique to one another. In some embodiments, at least one of a physical broadcast channel or a reference signal includes the signal indicative of enabling or disabling a function.

Figure 8:
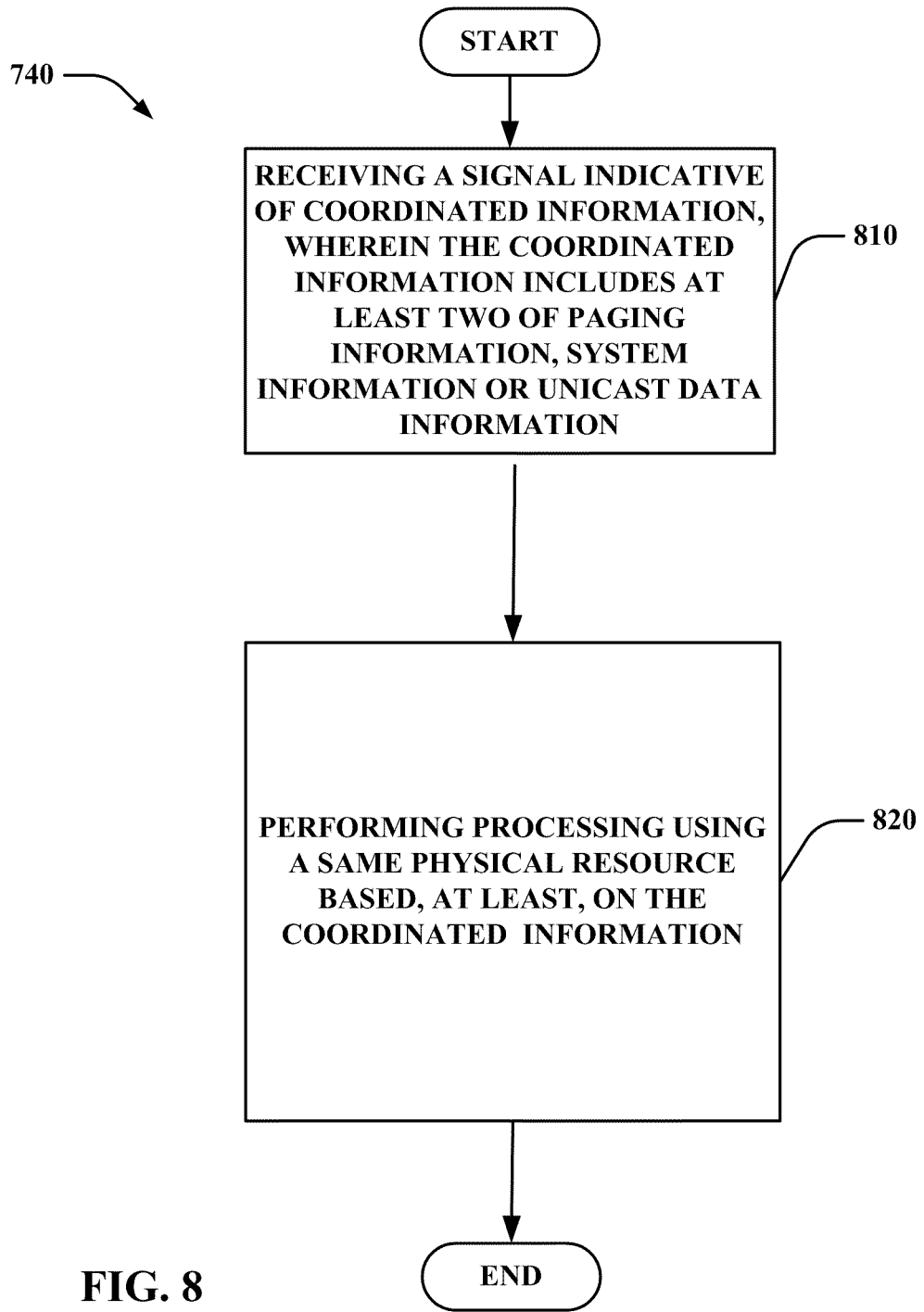
FIG. 8 is an illustration of another example of a flowchart of a method for facilitating communication of DL information in accordance with various aspects set forth herein.

FIG. 8 is a flowchart of a method for facilitating communication of DL information in accordance with various aspects set forth herein. At 810, method 800 can include receiving a signal indicative of coordinated information, wherein the coordinated information includes at least two of paging information, system information or unicast data information. At 820, method 800 can include performing processing using a same physical resource based, at least, on the coordinated information.

In some embodiments, the processing comprises interference cancellation. In some embodiments, the processing comprises joint detection.

Figure 9:
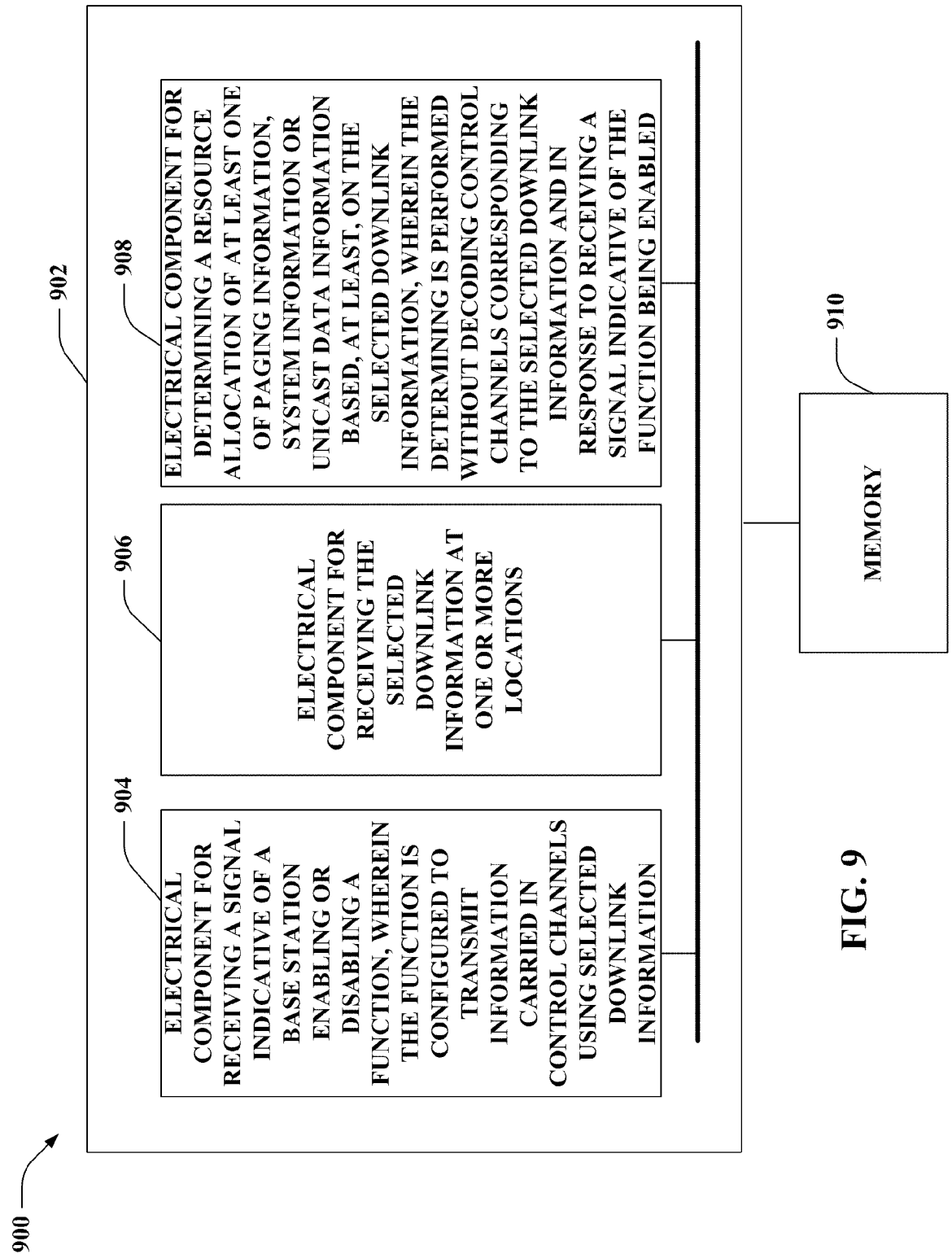
FIGS. 9, 10 and 11 are illustrations of block diagrams of example systems for facilitating communication of DL information in accordance with various aspects set forth herein.

FIG. 9 is an illustration of a block diagram of an example system of facilitating communication of DL information in accordance with various aspects set forth herein. It is to be appreciated that system 900 is represented as including functional blocks, which can be functional blocks that represent functions implemented by a processor, hardware, software, firmware, or combination thereof.

System 900 can include a logical or physical grouping 902 of electrical components. For example, logical or physical grouping 902 can include an electrical component 904 for receiving a signal indicative of a base station enabling or disabling a function, wherein the function is configured to transmit information carried in the control channel using selected downlink information.

Logical or physical grouping 902 can also include an electrical component 906 for receiving the selected downlink information at one or more locations.

Logical or physical grouping 902 can also include an electrical component 908 for determining a resource allocation of at least one of paging information or system information or unicast data information based, at least, on the selected downlink information, wherein the determining is performed without decoding control channels corresponding to the selected downlink information in response to receiving a signal indicative of the function being enabled. In various embodiments, the control channels that do not need to be decoded include the physical control format indicator channel and/or the physical downlink control channel. The physical control format indicator channel can inform the UE of the start symbol for the data, and the physical downlink control channel can inform the UE of the resource allocation, hybrid automatic repeat request identification information and/or other control information.

In some embodiments, the selected downlink information is information indicative of at least one of a cell identity, a system frame number, a cyclic prefix type or a closed subscriber group.

In some embodiments, receiving downlink information comprises blind decoding at the one or more locations based, at least, on receiving the selected downlink information at least two of the one or more locations. In some embodiments, at least one of a physical broadcast channel or a reference signal includes the signal indicative of enabling or disabling a function.

The logical or physical grouping 902 can also include an electrical component 910 for storing. The electrical component 910 for storing can be configured to store downlink information, locations, resource allocation information and/or DL data or control channel information, generally.

Figure 10:
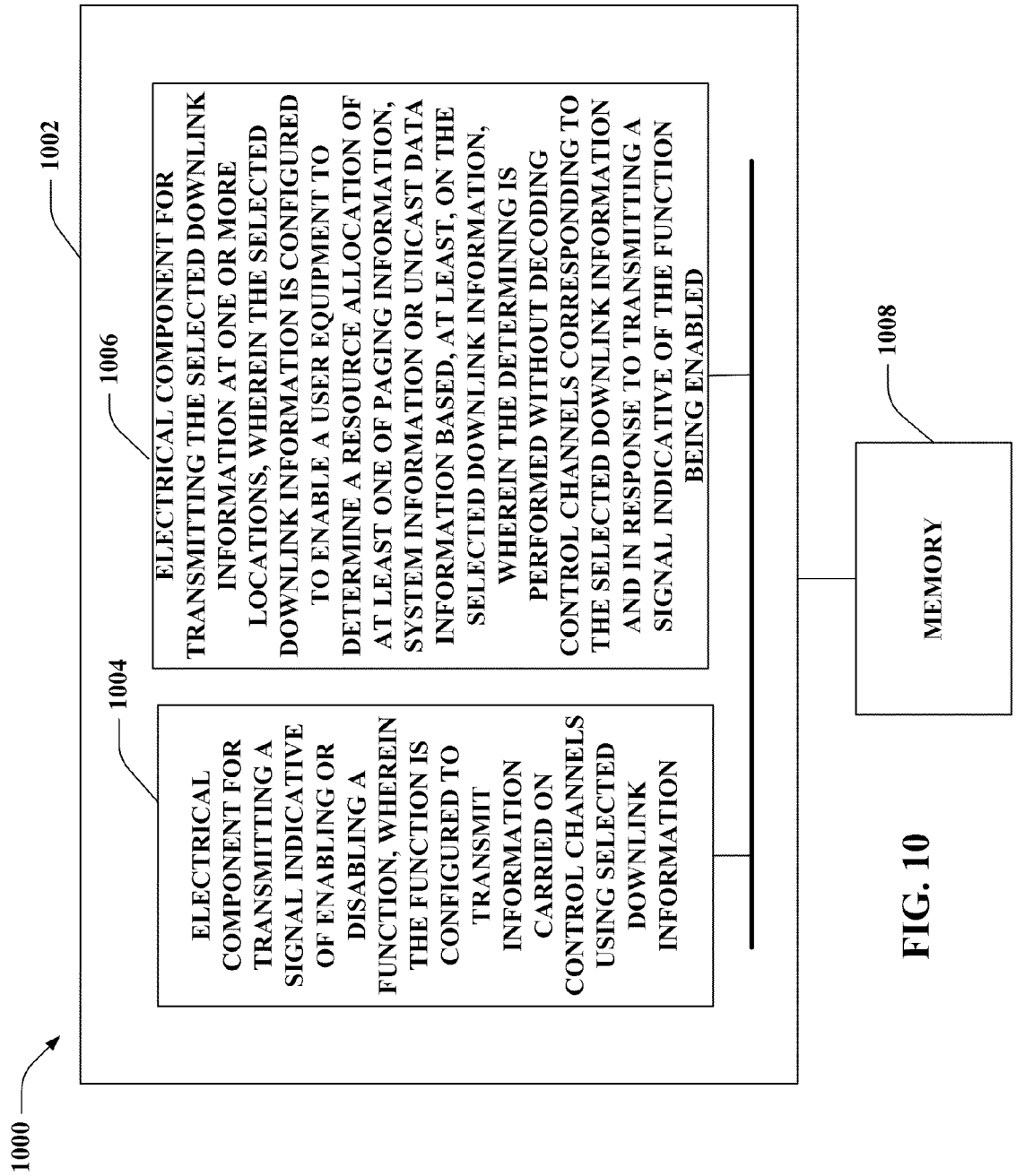

FIG. 10 is an illustration of a block diagram of an example system facilitating communication of DL information in accordance with various aspects set forth herein. It is to be appreciated that system 1000 is represented as including functional blocks, which can be functional blocks that represent functions implemented by a processor, hardware, software, firmware, or combination thereof. System 1000 can include a logical or physical grouping 1002 of electrical components for facilitating the communication.

The electrical components can act in conjunction. For instance, the logical or physical grouping 1002 can include an electrical component 1004 for transmitting a signal indicative of enabling or disabling a function, wherein the function is configured to transmit information carried in the control channel using selected downlink information.

The logical or physical grouping 1002 can also include an electrical component 1006 for transmitting the selected downlink information at one or more locations, wherein the selected downlink information is configured to enable a user equipment to determine a resource allocation of at least one of paging information or system information or unicast data information based, at least, on the selected downlink information, wherein the determining is performed without decoding control channels corresponding to the selected downlink information in response to transmitting a signal indicative of the function being enabled. In various embodiments, the control channels that do not need to be decoded include the physical control format indicator channel and/or the physical downlink control channel. The physical control format indicator channel can inform the UE of the start symbol for the data, and the physical downlink control channel can inform the UE of the resource allocation, hybrid automatic repeat request identification information and/or other control information.

In some embodiments, the selected downlink information is information indicative of at least one of a cell identity, a system frame number, a cyclic prefix type or a closed subscriber group.

In some embodiments, the one or more locations are not unique to one another. In some embodiments, at least one of physical broadcast channel or a reference signal includes the signal indicative of enabling or disabling a function.

The logical or physical grouping 1002 can include an electrical component 1008 for storing. The electrical component 1008 for storing can be configured to store paging, system and/or unicast data information, information indicative of cell identity, a system frame number, a cyclic prefix type or a closed subscriber group and/or resource allocation information.

Figure 11:
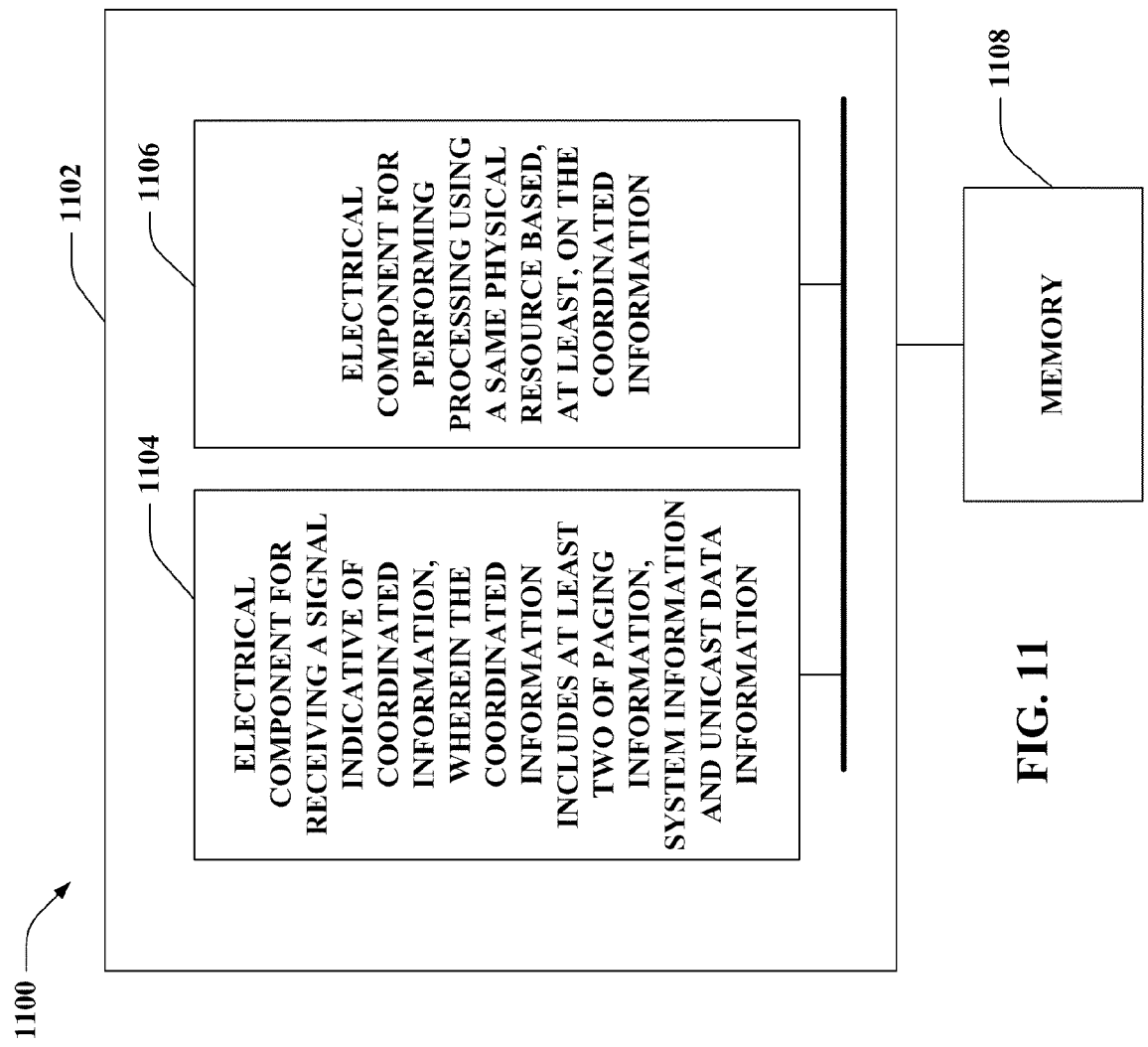

FIG. 11 is an illustration of a block diagram of an example system facilitating communication of DL information in accordance with various aspects set forth herein. It is to be appreciated that system 1100 is represented as including functional blocks, which can be functional blocks that represent functions implemented by a processor, hardware, software, firmware, or combination thereof. System 1100 can include a logical or physical grouping 1102 of electrical components for facilitating the frequency reuse.

The electrical components can act in conjunction. For instance, the logical or physical grouping 1102 can include an electrical component 1104 for receiving a signal indicative of coordinated information. The coordinated information can include at least two of paging information, system information or unicast data information.

The logical or physical grouping 1102 can also include an electrical component 1106 for performing processing using a same physical resource based, at least, on the coordinated information.

In some embodiments, the processing comprises interference cancellation. In some embodiments, the processing comprises joint detection.

The logical or physical grouping 1102 can include an electrical component 1108 for storing. The electrical component 1108 for storing can be configured to store paging, system or unicast data information, physical resource information, information for interference cancellation and/or information for joint detection.

A wireless multiple-access communication system can simultaneously support communication for multiple wireless access terminals. As mentioned above, each terminal can communicate with one or more BSs via transmissions on the forward and reverse links. The forward link (or downlink) refers to the communication link from the BSs to the terminals, and the reverse link (or uplink) refers to the communication link from the terminals to the BSs. This communication link can be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
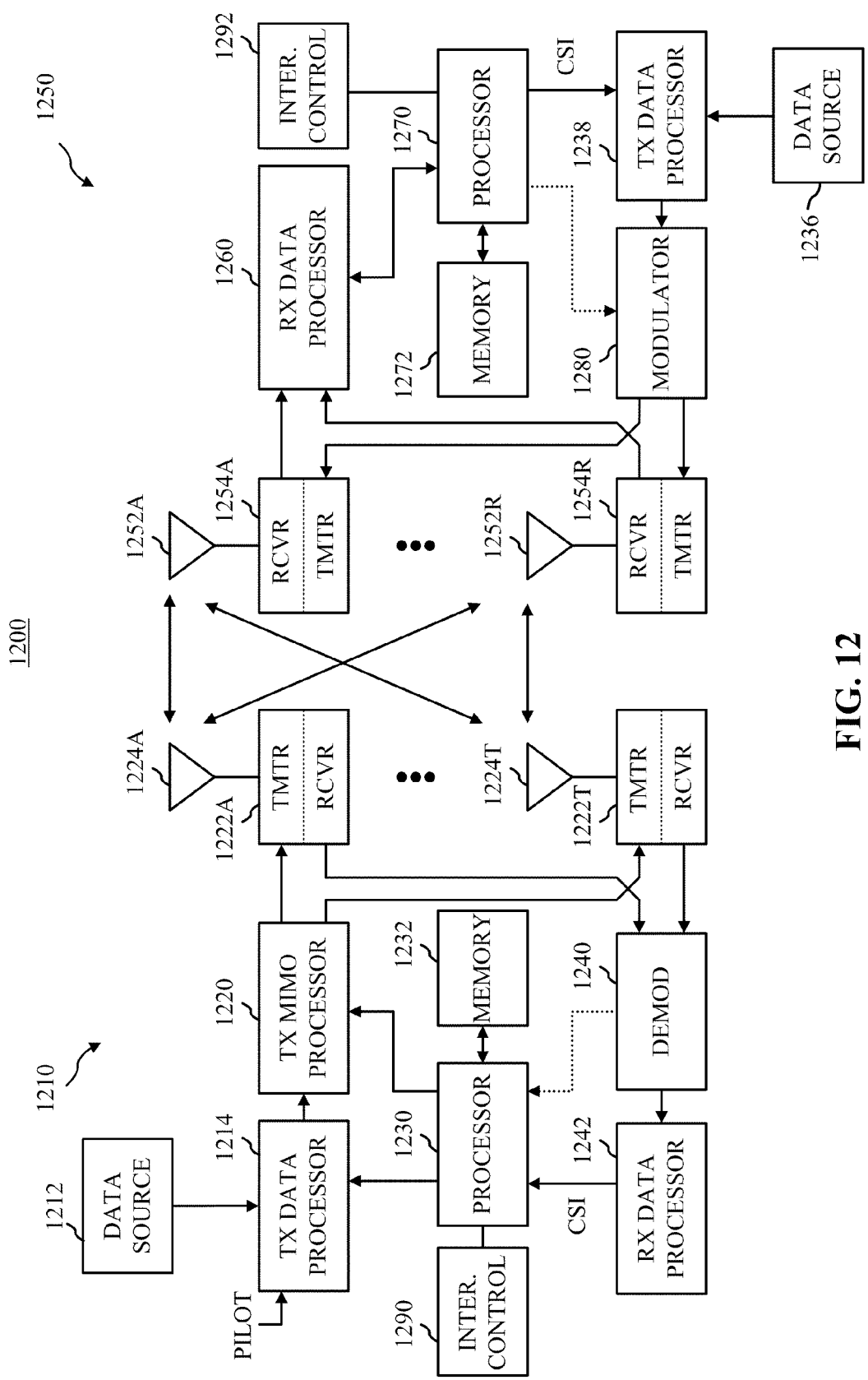
FIG. 12 shows an example wireless communication system in which the embodiments described herein can be employed in accordance with various aspects set forth herein.

FIG. 12 shows an example wireless communication system in which the embodiments described herein can be employed in accordance with various aspects set forth herein. The teachings herein may be incorporated into a node (e.g., a device) employing various components for communicating with at least one other node. FIG. 12 depicts several sample components that may be employed to facilitate communication between nodes. Specifically, FIG. 12 illustrates a wireless device 1210 (e.g., an access point) and a wireless device 1250 (e.g., an access terminal) of a wireless communication system 1200 (e.g., MIMO system). At the device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform interference control operations as taught herein. For example, an interference (INTER.) control component 1290 may cooperate with the processor 1230 and/or other components of the device 1210 to send/receive signals to/from another device (e.g., device 1250) as taught herein. Similarly, an interference control component 1292 may cooperate with the processor 1270 and/or other components of the device 1250 to send/receive signals to/from another device (e.g., device 1210). It should be appreciated that for each device 1210 and 1250 the functionality of two or more of the described components may be provided by a single component. For example, a single processing component may provide the functionality of the interference control component 1290 and the processor 1230 and a single processing component may provide the functionality of the interference control component 1292 and the processor 1270.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating communication of downlink information in a wireless communication system, the method comprising:
    receiving, by a user equipment (UE) and from a base station, a signal indicative of the base station enabling or disabling a function, wherein the function is configured to transmit at least one of a paging information, a system information or a unicast data information at one or more locations based on selected downlink information;
    receiving, by the UE, the at least one of the paging information, the system information or the unicast data information transmitted at the one or more locations; and
    determining, by the UE, a resource allocation of the at least one of the paging information, the system information or the unicast data information based, at least, on the selected downlink information, wherein the determining is performed without decoding control channels corresponding to the at least one of the paging information, the system information or the unicast data information and in response to receiving the signal indicative of the function being enabled.

2. The method of claim 1, wherein the selected downlink information is information indicative of at least one of a cell identity, a system frame number, a cyclic prefix type or a closed subscriber group.

3. The method of claim 1, wherein the selected downlink information is received on at least one of a physical control format indicator channel or a physical downlink control channel.

4. The method of claim 1, wherein receiving downlink information comprises blind decoding at the one or more locations based, at least, on receiving the selected downlink information at at least two of the one or more locations.

5. The method of claim 1, wherein at least one of a physical broadcast channel, a reference signal, a primary synchronization signal, a secondary synchronization signal or a pseudorandom sequence includes information about the signal indicative of enabling or disabling a function.

6. A computer program product, stored on a non-transitory computer-readable medium, and comprising code for causing a computer to:
    receive, by a user equipment (UE) and from a base station, a signal indicative of the base station enabling or disabling a function, wherein the function is configured to transmit at least one of a paging information, a system information or a unicast data information at one or more locations based on selected downlink information;
    receive, by the UE, the at least one of the paging information, the system information or the unicast data information transmitted at the one or more locations; and
    determine, by the UE, a resource allocation of the at least one of the paging information, the system information or the unicast data information based, at least, on the selected downlink information, wherein the determining is performed without decoding control channels corresponding to the at least one of the paging information, the system information or the unicast data information and in response to receiving the signal indicative of the function being enabled.

7. The computer program product of claim 6, wherein the selected downlink information is information indicative of at least one of a cell identity, a system frame number, a cyclic prefix type or a closed subscriber group.

8. The computer program product of claim 6, wherein the selected downlink information is received on at least one of a physical control format indicator channel or a physical downlink control channel.

9. The computer program product of claim 6, wherein receiving selected downlink information comprises blind decoding at the one or more locations based, at least, on receiving the selected downlink information at at least two of the one or more locations.

10. The computer program product of claim 6, wherein at least one of a physical broadcast channel, a reference signal, a primary synchronization signal, a secondary synchronization signal or a pseudorandom sequence includes information about the signal indicative of enabling or disabling a function.

11. An apparatus, comprising:
means for receiving, by a user equipment (UE) and from a base station, a signal indicative of the base station enabling or disabling a function, wherein the function is configured to transmit at least one of a paging information, a system information or a unicast data information at one or more locations based on selected downlink information;
means for receiving, by the UE, the at least one of the paging information, the system information or the unicast data information transmitted at the one or more locations; and
means for determining, by the UE, a resource allocation of the at least one of the paging information, the system information or the unicast data information based, at least, on the selected downlink information, wherein the determining is performed without decoding control channels corresponding to the at least one of the paging information, the system information or the unicast data information and in response to receiving the signal indicative of the function being enabled.

12. The apparatus of claim 11, wherein the selected downlink information is information indicative of at least one of a cell identity, a system frame number, a cyclic prefix type or a closed subscriber group.

13. The apparatus of claim 11, wherein the selected downlink information is received on at least one of a physical control format indicator channel or a physical downlink control channel.

14. The apparatus of claim 11, wherein receiving downlink information comprises blind decoding at the one or more locations based, at least, on receiving the selected downlink information at at least two of the one or more locations.

15. The apparatus of claim 11, wherein at least one of a physical broadcast channel, a reference signal, a primary synchronization signal, a secondary synchronization signal or a pseudorandom sequence includes information about the signal indicative of enabling or disabling a function.

16. An apparatus, comprising:
a memory; and
at least one processor coupled to the memory, and configured to:
receive, at a user equipment (UE) and from a base station, a signal indicative of the base station enabling or disabling a function, wherein the function is configured to transmit at least one of a paging information, a system information or a unicast data information at one or more locations based on selected downlink information;
receive, at the UE, the at least one of the paging information, the system information or the unicast data information transmitted at the one or more locations; and
determine, at the UE, a resource allocation of the at least one of the paging information, the system information or the unicast data information based, at least, on the selected downlink information, wherein the determining is performed without decoding control channels corresponding to the at least one of the paging information, the system information or the unicast data information and in response to receiving the signal indicative of the function being enabled.

17. The apparatus of claim 16, wherein the selected downlink information is information indicative of at least one of a cell identity, a system frame number, a cyclic prefix type or a closed subscriber group.

18. The apparatus of claim 16, wherein the selected downlink information is received on at least one of a physical control format indicator channel or a physical downlink control channel.

19. The apparatus of claim 16, wherein receiving downlink information comprises blind decoding at the one or more locations based, at least, on receiving the selected downlink information at at least two of the one or more locations.

20. The apparatus of claim 16, wherein at least one of a physical broadcast channel, a reference signal, a primary synchronization signal, a secondary synchronization signal or a pseudorandom sequence includes information about the signal indicative of enabling or disabling a function.

21. A method for facilitating communication of downlink information in a wireless communication system, the method comprising:
transmitting, by a base station, a signal indicative of the base station enabling or disabling a function, wherein the function is configured to transmit at least one of a paging information, a system information or a unicast data information at one or more locations based on selected downlink information; and
transmitting, by the base station, the at least one of the paging information, the system information or the unicast data information transmitted at the one or more locations, wherein the selected downlink information is configured to enable a user equipment to determine a resource allocation of the at least one of the paging information, the system information or the unicast data information based, at least, on the selected downlink information, wherein the determining is performed without decoding control channels corresponding to the at least one of the paging information, the system information or the unicast data information and in response to transmitting the signal indicative of the function being enabled.

22. The method of claim 21, wherein the selected downlink information is information indicative of at least one of a cell identity, a system frame number, a cyclic prefix type or a closed subscriber group.

23. The method of claim 21, wherein the selected downlink information is transmitted on at least one of a physical control format indicator channel or a physical downlink control channel.

24. The method of claim 21, wherein the one or more locations are not unique to one another.

25. The method of claim 21, wherein at least one of a physical broadcast channel, a reference signal, a primary synchronization signal, a secondary synchronization signal or a pseudorandom sequence includes information about the signal indicative of enabling or disabling a function.

26. A computer program product, stored on a non-transitory computer-readable medium, and comprising code for causing a computer to:
transmit, by a base station, a signal indicative of the base station enabling or disabling a function, wherein the function is configured to transmit at least one of a paging information, a system information or a unicast data information at one or more locations based on selected downlink information; and
transmit, by the base station, the at least one of the paging information, the system information or the unicast data information transmitted at the one or more locations, wherein the selected downlink information is configured to enable a user equipment to determine a resource allocation of the at least one of the paging information, the system information or the unicast data information based, at least, on the selected downlink information, wherein the determining is performed without decoding control channels corresponding to the at least one of the paging information, the system information or the unicast data information and in response to transmitting the signal indicative of the function being enabled.

27. The computer program product of claim 26, wherein the selected downlink information is information indicative of at least one of a cell identity, a system frame number, a cyclic prefix type or a closed subscriber group.

28. The computer program product of claim 26, wherein the selected downlink information is transmitted on at least one of a physical control format indicator channel or a physical downlink control channel.

29. The computer program product of claim 26, wherein the one or more locations are not unique to one another.

30. The computer program product of claim 26, wherein at least one of a physical broadcast channel, a reference signal, a primary synchronization signal, a secondary synchronization signal or a pseudorandom sequence includes information about the signal indicative of enabling or disabling a function.

31. An apparatus, comprising:
means for transmitting, by a base station, a signal indicative of the base station enabling or disabling a function, wherein the function is configured to transmit at least one of a paging information, a system information or a unicast data information at one or more locations based on selected downlink information; and
means for transmitting, by the base station, the at least one of the paging information, the system information or the unicast data information transmitted at the one or more locations, wherein the selected downlink information is configured to enable a user equipment to determine a resource allocation of the at least one of the paging information, the system information or the unicast data information based, at least, on the selected downlink information, wherein the determining is performed without decoding control channels corresponding to the at least one of the paging information, the system information or the unicast data information and in response to transmitting the signal indicative of the function being enabled.

32. The apparatus of claim 31, wherein the selected downlink information is information indicative of at least one of a cell identity, a system frame number, a cyclic prefix type or a closed subscriber group.

33. The apparatus of claim 31, wherein the selected downlink information is transmitted on at least one of a physical control format indicator channel or a physical downlink control channel.

34. The apparatus of claim 31, wherein the one or more locations are not unique to one another.

35. The apparatus of claim 31, wherein at least one of a physical broadcast channel, a reference signal, a primary synchronization signal, a secondary synchronization signal or a pseudorandom sequence includes information about the signal indicative of enabling or disabling a function.

36. An apparatus, comprising:
a memory; and
at least one processor coupled to the memory, and configured to:
transmit, from a base station, a signal indicative of the base station enabling or disabling a function, wherein the function is configured to transmit at least one of a paging information, a system information or a unicast data information at one or more locations based on selected downlink information; and
transmit, from the base station, the at least one of the paging information, the system information or the unicast data information transmitted at the one or more locations, wherein the selected downlink information is configured to enable a user equipment to determine a resource allocation of the at least one of the paging information, the system information or the unicast data information based, at least, on the selected downlink information, wherein the determining is performed without decoding control channels corresponding to the at least one of the paging information, the system information or the unicast data information and in response to transmitting the signal indicative of the function being enabled.

37. The apparatus of claim 36, wherein the selected downlink information is information indicative of at least one of a cell identity, a system frame number, a cyclic prefix type or a closed subscriber group.

38. The apparatus of claim 36, wherein the selected downlink information is transmitted on at least one of a physical control format indicator channel or a physical downlink control channel.

39. The apparatus of claim 36, wherein the one or more locations are not unique to one another.

40. The apparatus of claim 36, wherein at least one of a physical broadcast channel, a reference signal, a primary synchronization signal, a secondary synchronization signal or a pseudorandom sequence includes information about the signal indicative of enabling or disabling a function.

41. The method of claim 2, wherein the selected downlink information is information indicative of a cell identity.

42. The method of claim 2, wherein the selected downlink information is information indicative of a system frame number.

43. The method of claim 2, wherein the selected downlink information is information indicative of a cyclic prefix type.

44. The method of claim 2, wherein the selected downlink information is information indicative of a closed subscriber group.

45. The method of claim 5, wherein a physical broadcast channel includes information about the signal indicative of enabling or disabling a function.

46. The method of claim 5, wherein a reference signal includes information about the signal indicative of enabling or disabling a function.

47. The method of claim 5, wherein a primary synchronization signal includes information about the signal indicative of enabling or disabling a function.

48. The method of claim 5, wherein a secondary synchronization signal includes information about the signal indicative of enabling or disabling a function.

49. The method of claim 5, wherein a pseudorandom sequence includes information about the signal indicative of enabling or disabling a function.

\* \* \* \* \*